(12) United States Patent
Shimoda et al.

(10) Patent No.: US 7,964,682 B2
(45) Date of Patent: Jun. 21, 2011

(54) METHOD FOR PRODUCING PHOSPHORIC ACID ESTER-BASED POLYMER

(75) Inventors: Masaaki Shimoda, Wakayama (JP); Yoshinao Kono, Wakayama (JP); Toshimasa Hamai, Wakayama (JP); Daisuke Hamada, Wakayama (JP); Yoshikazu Morii, Wakayama (JP); Yoshihito Naka, Wakayama (JP); Yoshiaki Tanisho, Wakayama (JP)

(73) Assignee: Kao Corporation, Tokyo (JP)

( * ) Notice: Subject to any disclaimer, the term of this patent is extended or adjusted under 35 U.S.C. 154(b) by 555 days.

(21) Appl. No.: 11/991,434

(22) PCT Filed: Sep. 4, 2006

(86) PCT No.: PCT/JP2006/317925
§ 371 (c)(1),
(2), (4) Date: Apr. 30, 2008

(87) PCT Pub. No.: WO2007/029837
PCT Pub. Date: Mar. 15, 2007

(65) Prior Publication Data
US 2009/0258969 A1    Oct. 15, 2009

(30) Foreign Application Priority Data

| Sep. 5, 2005 | (JP) | 2005-256307 |
| Sep. 5, 2005 | (JP) | 2005-256308 |
| Sep. 16, 2005 | (JP) | 2005-270182 |
| Sep. 20, 2005 | (JP) | 2005-272282 |

(51) Int. Cl.
C08F 30/02    (2006.01)

(52) U.S. Cl. ................ 526/274; 526/277

(58) Field of Classification Search ............ 526/274, 526/277
See application file for complete search history.

(56) References Cited

U.S. PATENT DOCUMENTS
2002/0050232 A1    5/2002   Yamashita et al.

FOREIGN PATENT DOCUMENTS

| EP | 1209178 A1 | 5/2002 |
| EP | 1 767 504 A1 | 3/2007 |
| JP | 1-226757 A | 9/1989 |
| JP | 9-86990 A | 3/1997 |
| JP | 11-79811 A | 3/1999 |
| JP | 2000-327386 A | 11/2000 |
| JP | 2001-31722 A | 2/2001 |
| JP | 2001-146447 A | 5/2001 |
| JP | 2001-146450 A | 5/2001 |
| JP | 2002-121056 A | 4/2002 |
| JP | 2003-12357 A | 1/2003 |
| JP | 2003-012357 A | 1/2003 |
| JP | 2003-183338 A | 7/2003 |
| JP | 2005-118684 A | 5/2005 |
| JP | 2006-52381 A | 2/2006 |
| JP | 2006-052381 A | 2/2006 |
| JP | 2006-137627 A | 6/2006 |
| WO | WO-00/12576 A | 3/2000 |
| WO | WO-00/12576 A1 | 3/2000 |
| WO | WO-01/10920 A | 2/2001 |
| WO | WO-01/10920 A1 | 2/2001 |
| WO | WO-01/14438 A | 3/2001 |
| WO | WO-01-14438 A1 | 3/2001 |

*Primary Examiner* — Edward J Cain
(74) *Attorney, Agent, or Firm* — Birch, Stewart, Kolasch & Birch, LLP

(57) ABSTRACT

Method for producing phosphoric acid ester-based polymer by copolymerizing monomer 1 of formula (1), monomer 2 of formula (2), and monomer 3 of formula (3):

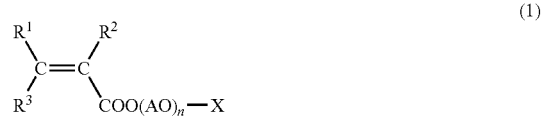

wherein the variables are as defined in the specification;

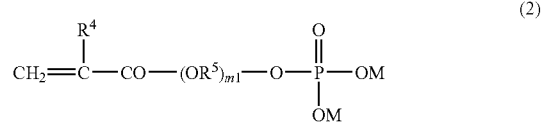

wherein the variables are as defined in the specification; and

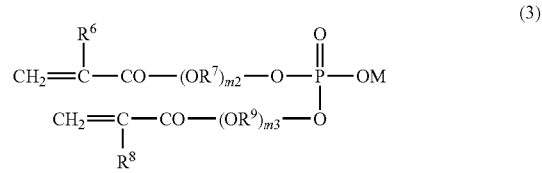

wherein the variables are as defined in the specification, at pH $\leq 7$ in solvent having dissolved oxygen concentration of 0.01-4.0 mg/kg, or in presence of phosphonic acid-based chelating agent, or by mixing monomers 1 to 3 at 10-50 °C., initiating polymerization within 72 hours, and maintaining the temperature at 10-50 °C. until polymerization is initiated. The phosphoric acid ester-based polymer may be used as a dispersant in a hydraulic composition.

14 Claims, 1 Drawing Sheet

METHOD FOR PRODUCING PHOSPHORIC ACID ESTER-BASED POLYMER

FIELD OF THE INVENTION

The invention relates to a method for producing a phosphoric acid ester-based polymer, and a method for producing a dispersant for hydraulic compositions. More particularly, the invention relates to a phosphoric acid ester-based polymer, a dispersant for hydraulic composition containing the same, and a hydraulic composition containing the same.

BACKGROUND OF THE INVENTION

Among the additives for hydraulic compositions, there is an agent called high performance water-reducing agent, which is highly effective in imparting fluidity. Representative examples thereof include naphthalenesulfonic acid-formaldehyde condensate salts (naphthalene-based), melaminesulfonic acid-formaldehyde condensate salts (melamine-based), polycarboxylic acids having a polyoxyalkylene chain, and the like.

In recent years, the tendency regarding concrete, which is a representative hydraulic composition, is more strongly oriented toward an increase in the durability, and for example, impartation of high strength is being achieved by reducing the amount of water used in concrete, while this tendency is anticipated to ever increase in the future. It has become prevalent to use polycarboxylic acid-based water-reducing agents having excellent water-reducing properties and fluidity maintainability in reducing the amount of water. However, this reduction in the amount of water is accompanied by an increase in the fresh concrete viscosity (hereinafter, may also be referred to as concrete viscosity), thus causing problems involving deterioration in the workability and constructibility such as in pressure pumping, stamping and filling into formwork. This problem of viscosity increment has not been satisfactorily addressed even with the polycarboxylic acid-based water-reducing agents, and an additive having a higher concrete viscosity-reducing effect is being desired.

Under such circumstances, JP-A 11-79811 discloses a concrete admixture containing, as an essential component, a vinyl copolymer having an oxyalkylene group with a long chain length and a specific monomer.

Meanwhile, JP-A 2000-327386 proposes to use a polymerization product of a monoester or monoether having a polyalkylene glycol chain with a monomer having an unsaturated bond and a phosphoric acid group, in order to obtain a dispersant for cement which can exhibit excellent fluidity properties, good dispersing effects and rapid setting properties, regardless of the mixing ratio of water.

As for the method for producing a cement dispersant by radical polymerization in the presence of a solvent, for example, JP-A 2001-146447 discloses a copolymer produced by reacting a polyalkylene glycol (meth)acrylate and/or polyalkylene glycol (meth) allyl ether with (meth) acrylic acid and/or maleic acid, using a polymerization solvent having a dissolved oxygen concentration of 0.01 to 4.0 mg/kg.

JP-A 2001-31722 discloses a method of copolymerizing an unsaturated polyalkylene glycol and an unsaturated polycarboxylic acid at a dissolved oxygen concentration of 5 ppm.

JP-A 2001-146450 discloses a method for producing a cement dispersant by subjecting a polyalkylene glycol-based monomer and a monomer containing a carboxylic acid-based monomer to a copolymerization reaction in the presence of a phosphonic acid-based chelating agent. In dispersants for hydraulic compositions, obtained by a copolymerization reaction, such as polycarboxylic acid dispersants, a molecular weight thereof may have a significant influence on the obtained performance of the copolymer, even with the same composition ratio (molar ratio). Although the adjustment of molecular weight on a laboratory scale can be controlled by varying the type or amount of the chain transfer agent, and the type or amount of the polymerization initiator, the process on an industrial scale is associated with many uncertainties, and the fluctuation in the molecular weight tends to increase.

Furthermore, in the production of polycarboxylic acid polymers, when a water-soluble thiol compound is used as a chain transfer agent, foul odor remains behind in many cases, which is likely to cause putrefaction during storage. Thus, complicated purification is needed to prevent these.

JP-A 1-226757 proposes a method which does not require the molecular weight adjustment using a water-soluble thiol compound, which process would otherwise necessitate complicated purification.

Furthermore, polymers obtained by a method of feeding monomers as shown in the method for producing polycarboxylic acid-based dispersants, exhibit significant variances in the performance required for a cement dispersant.

JP-A 1-226757 proposes a method of performing polymerization by introducing a monomer component and a chain transfer agent component into a reaction vessel in advance, and then adding a polymerization initiator.

JP-A 9-86990 proposes a method of performing polymerization while respectively adding dropwise a solution prepared in advance by mixing a monomer component and a chain transfer agent, and a polymerization initiator.

Conventional additives for hydraulic compositions often need to be stored in storage tanks until the time of use. If an organic substance like an additive for hydraulic compositions stagnates in the storage tank, anaerobic conditions gradually develop therein, and anaerobic bacteria grow in large quantities, causing contamination of the storage tank and generation of putrefying odor. Moreover, many of copolymers like the polycarboxylic acid-based water-reducing agents make use of a chain transfer agent in the reaction process. When a water-soluble thiol compound is used as a chain transfer agent, foul odor remains behind in many cases, which is likely to cause putrefaction during storage. Thus, complicated purification is needed to prevent these.

JP-A 2003-12357 proposes a degeneration preventive agent or a preventive agent for hydrogen sulfide generation.

SUMMARY OF THE INVENTION

Invention (V) of the invention relates to a method for producing a phosphoric acid ester-based polymer, including a mixing step of preparing a mixed solution containing a monomer 1 represented by the following formula (1), a monomer 2 represented by the following formula (2), and a monomer 3 represented by the following formula (3) and a copolymerizing step of copolymerizing monomer 1, monomer 2 and monomer 3, wherein the mixing step is mixing the monomers 1, 2 and 3 at a temperature of 10 to 50° C., the copolymerizing step is copolymerizing the monomers at pH 7 or lower, in a polymerization solvent having a dissolved oxygen concentration at 25° C. of 0.01 to 4.0 mg/kg, in the presence of a phosphonic acid chelating agent, the copolymerizing step is initiated within 72 hours after the mixing step and the temperature of the mixed solution is maintained in the range of 10 to 50° C. until the copolymerizing step is initiated:

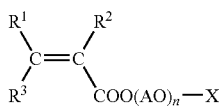
(1)

wherein $R^1$ and $R^2$ each represent a hydrogen atom or a methyl group; and $R^3$ represents a hydrogen atom or —COO $(AO)_nX$ [wherein AO represents an oxyalkylene group or oxystyrene group having to 4 carbon atoms; n represents an average number of added moles of AO, and is a number from 3 to 200; and X represents a hydrogen atom or an alkyl group having 1 to 18 carbon atoms],

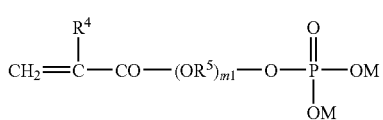
(2)

wherein $R^4$ represents a hydrogen atom or a methyl group; $R^5$ represents an alkylene group having 2 to 12 carbon atoms; m1 represents a number from 1 to 30; and M represents a hydrogen atom, an alkali metal or an alkaline earth metal, and

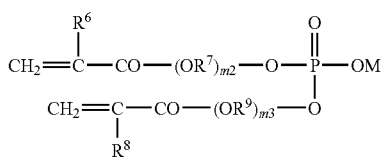
(3)

wherein $R^6$ and $R^8$ each represent a hydrogen atom or a methyl group; $R^7$ and $R^9$ each represent an alkylene group having 2 to 12 carbon atoms; m2 and m3 each represent a number from 1 to 30; and M represents a hydrogen atom, an alkali metal or an alkaline earth metal.

Furthermore, invention (I) of the invention relates to a method for producing a phosphoric acid ester-based polymer, including copolymerizing the monomer 1 represented by formula (1), the monomer 2 represented by formula (2), and the monomer 3 represented by formula (3) at pH 7 or lower in the presence of a polymerization solvent having a dissolved oxygen concentration at 25° C. of 0.01 to 4.0 mg/kg.

Invention (II) of the invention relates to a method for producing a phosphoric acid ester-based polymer, including copolymerizing the monomer 1 represented by formula (1), the monomer 2 represented by formula (2), and the monomer 3 represented by formula (3) at pH 7 or lower in the presence of a phosphonic acid-based chelating agent.

Invention (III) of the invention relates to a method for producing a phosphoric acid ester-based polymer from a mixed solution containing the monomer 1 represented by formula (1), the monomer 2 represented by formula (2), and the monomer 3 represented by formula (3), including obtaining the mixed solution by mixing the monomers 1 to 3 at a temperature of 10 to 50° C., initiating the polymerization within 72 hours after the mixing of the monomers 1 to 3, and maintaining the temperature of the mixed solution in the range of 10 to 50° C. until the time when polymerization is initiated.

Invention (IV) of the invention relates to a method for production, including adding specified amounts of hydrogen peroxide and a preservative, after the copolymerizing according to the method of invention (I), (II), (III) or (V) of the invention.

In addition, the invention relates to use of the phosphoric acid ester-based polymer obtained according to any one of the methods described above, as a dispersant for hydraulic compositions. The invention also relates to a hydraulic composition containing the phosphoric acid ester-based polymer obtained by any one of the methods described above, a hydraulic powder and water.

DETAILED DESCRIPTION OF THE INVENTION

However, any of the methods of JP-A 2001-146447, JP-A 2000-327386, JP-A 2001-31722, JP-A 11-79811 and JP-A 2001-146450 mention about a method which corresponds to a technology related to the so-called polycarboxylic acid-based polymers, and allows stable (less fluctuation in the molecular weight with the production lot, etc.) production of a phosphoric acid ester-based polymer which can impart an excellent dispersing effect or viscosity reducing effect, and an effect of excellently providing both of the two effects, to a hydraulic composition containing a hydraulic powder, and thus can be used as a dispersant for hydraulic compositions having good performance, in an industrially practical level with good reproducibility.

The invention provides a method for stably (less fluctuation in the molecular weight with production lot, etc.) producing a copolymer which can impart an excellent dispersing effect and an excellent viscosity reducing effect to a hydraulic composition containing a hydraulic powder, and thus serves as a dispersant for hydraulic compositions having good performance, in an industrially practical level with good reproducibility.

The invention also provides a method capable of producing a copolymer which can be stably stored without putrefying during the storage.

Invention (I) relates to a method for producing a phosphoric acid ester-based polymer, the method containing copolymerizing the monomer 1 represented by formula (1), the monomer 2 represented by formula (2) and the monomer 3 represented by formula (3), in a polymerization solvent having a dissolved oxygen concentration at 25° C. of 0.01 to 4.0 mg/kg, at pH 7 or lower.

Invention (II) relates to a method for producing a phosphoric acid ester-based polymer, the method containing copolymerizing the monomer 1 represented by formula (1), the monomer represented by formula (2) and the monomer 3 represented by formula (3), in the presence of a phosphonic acid-based chelating agent, at pH 7 or lower.

Invention (III) relates to a method for producing a phosphoric acid ester-based polymer using a mixed solution containing the monomer 1 represented by formula (1), the monomer 2 represented by formula (2) and the monomer 3 represented by formula (3), wherein the mixed solution is obtained by mixing the monomers 1 to 3 at a temperature of 10 to 50° C., polymerization is initiated within 72 hours after mixing the monomers 1 to 3, and the temperature of the mixed solution is maintained in the range of 10 to 50° C. until the time that polymerization is initiated.

Invention (IV) relates to a method for production, the method containing adding specific amounts of hydrogen peroxide and a preservative, after the copolymerizing according to the method of invention (I), (II), (III) or (V).

In addition, $R^5$ in the formula (2), and $R^7$ and $R^9$ in the formula (3) are each an alkylene group having 2 to 12 carbon atoms, which includes a polymethylene group such as a trimethylene group or a tetramethylene group.

The invention also relates to a use of the phosphoric acid ester-based polymer of the invention as a dispersant for hydraulic compositions. Furthermore, the invention relates to a hydraulic composition containing a hydraulic powder, water and the phosphoric acid ester-based polymer of the invention.

According to the invention, there is provided a method allowing stable production, with good reproducibility, of a phosphoric acid ester-based polymer which is suitable as a dispersant for hydraulic compositions capable of suppressing an increase in the molecular weight due to cross-linking or a decrease in the performance, even in the case of using a monomer containing a phosphoric acid ester forming many diester bodies. Furthermore, in the production method of the invention, the characteristics of the phosphoric acid ester-based polymer as a dispersant for hydraulic compositions are not impaired. The dispersant containing the phosphoric acid ester-based polymer obtained by the production method of the invention can impart an excellent dispersing effect and an excellent viscosity reducing effect to a hydraulic composition containing a hydraulic powder, and thus has good performance.

<Method for Producing Phosphoric Acid Ester-Based Polymer>

Embodiments that are common to the methods for producing a phosphoric acid ester-based polymer of invention (I) to (V) will be described in detail.

The inventors of the invention found that a specific phosphoric acid ester-derived polymer is useful in reducing the viscosity of hydraulic compositions. They also found an appropriate method for producing the polymer on an industrial scale.

Hereinafter, the method for producing a phosphoric acid ester-based polymer using the monomers 1 to 3 will be described.

From an industrial viewpoint, phosphoric acid ester monomers are usually available as mixtures including a monoester species (monomer 2) and a diester species (monomer 3). Among them, the diester species is prone to attain high molecular weights (gelation) by cross-linking, and thus in the fields utilizing that property, for example, in the applications as a thickening agent, an adhesive, a coating agent or the like, such mixtures can be suitably used without being under too many constraints in the production. On the other hand, in the additives (dispersant, water-reducing agent, and the like) for hydraulic compositions, a copolymer containing a phosphoric acid group is preferred because it has an excellent adsorption power for hydraulic materials. However, an increase in the molecular weight results in a decrease in the dispersibility or in the viscosity reducing effect, and thus it is not preferable even in terms of handlability. Nevertheless, from the viewpoint of the uses of the hydraulic compositions or economic points, it is industrially disadvantageous to separate a monoester species and a diester species from such mixture of a phosphoric acid ester, and use them as raw materials.

In the production method of invention (I), the monomer 1, the monomer 2 which is a phosphoric acid ester monomer, and the monomer 3 are copolymerized in a polymerization solvent having a dissolved oxygen concentration at 25° C. of 0.01 to 4.0 mg/kg, at pH 7 or lower.

In the production method of invention (II), the monomer 1, the monomer 2 which is a phosphoric acid ester monomer, and the monomer 3 are copolymerized in the presence of a phosphonic acid-based-chelating agent, at pH 7 or lower.

The production method of invention (III) uses a mixed solution containing the monomer 1, the monomer 2 and the monomer 3, the mixed solution being a solution obtained by mixing the monomers 1 to 3 at a temperature of 10 to 50° C., and polymerization is initiated within 72 hours after the mixing of the monomers 1 to 3, while the temperature of the mixed solution is maintained in the range of 10 to 50° C. until the polymerization is initiated.

The production method of invention (V) is a method which satisfies all of the requirements of inventions (I), (II) and (III).

By means of this production method of invention (I), (II), (III) and (V), a polymer can be stably produced with good reproducibility, without the occurrence of cross-linking (increase in the molecular weight, gelation), even if a raw material including a diester species is used, and also, the excellent performance of a phosphoric acid ester-based polymer as a dispersant for hydraulic compositions can be maintained. Thus, this production method is highly advantageous in the field of hydraulic composition.

Furthermore, the production method of invention (IV) involves addition of specific amounts of hydrogen peroxide and a preservative, after the copolymerization according to the production method of invention (I), (II), (III) or (V). Thereby, putrefaction or generation of foul odor is suppressed, and the excellent performance of the phosphoric acid ester-based polymer as a dispersant for hydraulic composition can be maintained. Thus, the production method is a highly advantageous production method in the field of hydraulic composition.

The phosphoric acid ester-based polymer according to the invention is a polymer obtained by copolymerizing the monomer having an oxyalkylene group represented by the formula (1), and the monomers 2 and 3 having a phosphoric acid group represented by the formulas (2) and (3), respectively.

Preferred examples of the monomers 1 to 3 used in the invention are as follows, and commercially available products or reaction products can also be used.

[Monomer 1]

With regard to the monomer 1, $R^3$ in the formula (1) is preferably a hydrogen atom; and AO is preferably an oxyalkylene group having 2 to 4 carbon atoms, and more preferably contains an ethyleneoxy group (hereinafter, EO group), while it is preferable that the EO group occupies 70% by mole or more, more preferably 80% by mole or more, and even more preferably 90% by mole or more, of all of the AO. It is even more preferable that all of the AO are EO groups. Further, X is preferably a hydrogen atom, or an alkyl group having 1 to 18, preferably 1 to 12, more preferably 1 to 4, and even more preferably 1 or 2, carbon atoms, and is even more preferably a methyl group. Specifically, there may be mentioned ω-methoxypolyoxyalkylene methacrylic acid ester, ω-methoxypolyoxyalkylene acrylic acid ester, or the like, and ω-methoxypolyoxyalkylene methacrylic acid ester is more preferred. Here, n in the formula (1) is an average number of added moles. In terms of the dispersibility and viscosity imparting effects of the polymer on a hydraulic composition, n is 3 to 200, and preferably 4 to 120. It is also acceptable that AO's in an average number n of the repeating units are different from each other, and thus random addition or block addition, or a mixture of these is included in the monomer. AO may also include a propyleneoxy group or the like, in addition to the EO group.

[Monomer 2]

As for the monomer 2, a phosphoric acid monoester of an organic hydroxy compound may be mentioned. Specifically, there may be mentioned polyalkylene glycol mono (meth) acrylic acid phosphoric acid esters, or the like. Examples thereof include phosphoric acid mono-[(2-hydroxyethyl)methacrylic acid]ester, phosphoric acid mono-[(2-hydroxyethyl)acrylic acid ester], and the like. Among them, from the viewpoints of the ease of production and the stability in the product quality of products, phosphoric acid mono-[(2-hydroxyethyl)methacrylic acid]ester is preferred.

[Monomer 3]

As for the monomer 3, a phosphoric acid diester of an organic hydroxy compound may be mentioned. Specifically, there may be mentioned polyalkylene glycol di(meth)acrylic acid phosphoric acid diesters, or the like. Examples thereof include phosphoric acid di[(2-hydroxyethyl)methacrylic acid]ester, phosphoric acid di[(2-hydroxyethyl)acrylic acid] ester, and the like. Among them, from the viewpoints of the ease of production and the stability in the product quality of products, phosphoric acid di[(2-hydroxyethyl)methacrylic acid]ester is preferred.

Any of the monomers 2 and 3 may be a salt, and the salts may include alkali metal salts, alkaline earth metal salts, ammonium salts and alkylammonium salts of these compounds.

m1 of the monomer 2, and m2 and m3 of the monomer 3 are each preferably 1 to 20, more preferably 1 to 10, and even more preferably 1 to 5.

In the production method of the invention, a monomer mixture including the monomer 2 and the monomer 3 can be used.

As for such monomer mixture including the monomer 2 and monomer 3, commercially available products including a monoester species and a diester species can be used, and for example, Phosmer-M, Phosmer-PE, Phosmer-P (Unichemical Co., Ltd.), JAMP514, JAMP514P, JMP100 (all from Johoku Chemical Co., Ltd.), Light Ester P-1M, Light Acrylate P-1A (all from Kyoeisha Chemical Co., Ltd.), MR200 (Daihachi Chemical Industry Co., Ltd.), Kayamer (Nippon Kayaku Co., Ltd.), Ethylene glycol methacrylate phosphate (Aldrich reagent), and the like are available.

A monomer mixture including the monomer 2 and the monomer 3 can also be produced as a reaction product by, for example, reacting the organic hydroxy compound represented by formula (4) with a phosphorylating agent such as phosphoric anhydride ($P_2O_5$) or orthophosphoric acid and water at a predetermined feed ratio.

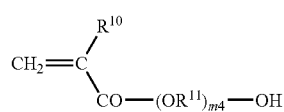

(4)

wherein $R^{10}$ represents a hydrogen atom or a methyl group; $R^{11}$ represents an alkylene group having 2 to 12 carbon atoms; and m4 represents a number from 1 to 30.

Thus, the phosphoric acid ester obtained by reacting the organic hydroxy compound represented by the formula (4) with a phosphorylating agent, can be used.

As the phosphorylating agent, there may be mentioned orthophosphoric acid, phosphorus pentoxide (phosphoric anhydride), polyphosphoric acid, phosphorus oxychloride and the like, and orthophosphoric acid and phosphorus pentoxide are preferred. These may be used individually or in combination of two or more species. Further, the phosphorylating agent (Z) to be described later is also preferable. In the invention, the amount of the phosphorylating agent to be used in reacting the organic hydroxy compound with the phosphorylating agent, can be appropriately determined at the right time in accordance with the desired phosphoric acid ester composition.

The monomers 2 and 3 are phosphoric acid esterification products of monomers having an unsaturated bond and a hydroxyl group, and it has been recognized that the commercially available products or reaction products mentioned above contain compounds other than monoester species (monomer 2) and diester species (monomer 3). Those other compounds are believed to be mixtures of polymerizable and non-polymerizable compounds, but such mixtures (monomer mixtures) can be used directly in the invention.

The contents of the monomers 2 and 3 in the monomer mixture can be calculated on the basis of the results of $^{31}P$-NMR measurement.

<Conditions for $^{31}P$-NMR Measurement>

Inverse-gated-decoupling method
Range of measurement: 6459.9 Hz
Pulse delay time: 30 sec
Observation data point: 10336
Pulse width (5.833 μsec), 35° pulse
Solvent: $CD_3OH$ (deuterated methanol) (30% by weight)
Number of integration: 128

Under these conditions, the signals of the obtained chart are attributable to the following compound, and thus the relative amount ratios can be determined from the area ratios.

For example, in the case where the organic hydroxy compound is a phosphorylation product of "2-hydroxyethyl methacrylate," the signals can be assigned as follows.

1.8 ppm to 2.6 ppm: Phosphoric acid
0.5 ppm to 1.1 ppm: Monomer 2 (monoester species)
−0.5 ppm to 0.1 ppm: Monomer 3 (diester species)
−1.0 ppm to 0.6 ppm: Triester species
−11.1 ppm to 10.9 ppm, −12.4 ppm~−12.1 ppm: Pyrophosphoric acid monoester
−12.0 ppm to −11.8 ppm: Pyrophosphoric acid diester
−11.2 ppm to −11.1 ppm: Pyrophosphoric acid
Peaks other than those: Unknown According to the invention, the phosphoric acid contents in the monomer mixture are quantified, and the proportions of the monomer 2 and the monomer 3 in the monomer mixture are determined. Specifically, the calculation is carried out as follows.

The absolute amount (% by weight) of the phosphoric acid content in a sample is determined by gas chromatography. Since the relative molar ratios of phosphoric acid, the monoester species and the diester species in the sample are determined from the results of $^{31}P$-NMR, the absolute amounts of the monoester species and the diester species are calculated on the basis of the absolute amount of phosphoric acid.

[Phosphoric Acid Content]

The conditions for gas chromatography are as follows.
Sample: methylated with diazomethane
Example) 1 to 1.5 cc of a diethyl ether solution of diazomethane is added to 0.1 g of a sample to methylate the sample.
Column: Ultra ALLOY, 15 m×0.25 mm (internal diameter)×0.15 μm df
Carrier gas: He
Split ratio: 50:1
Column temperature: 40° C. (5 min)
(Retention)→10° C./min (temperature elevation)→after reacting 300° C., retained for 15 min
Inlet temperature: 300° C.
Detector temperature: 300° C.

A peak derived from phosphoric acid is detected around 9 minutes under the conditions described above, and the phosphoric acid content in an unknown sample can be calculated by a calibration curve method.

[Contents of Monoester Species and Diester Species]

While taking the phosphoric acid content determined as described above as the reference, the total amount of the monoester species and the diester species in the reagent used in the following Examples or the like, was calculated as follows. In addition, it was considered that pyrophosphoric acid monoester, pyrophosphoric acid diester and pyrophosphoric acid under hydrolysis during the polymerization procedure, and thus the decomposition products were imputed to the phosphoric acid and monoester species upon calculation.

Phosmer-M: 81.8% by weight

When the feed ratios of the monomers are calculated from the above result and the NMR results, on the basis of the data for the monoester species and diester species, in the case of Example 1-1, the following is obtained.

ω-Methoxypolyethylene glycol monomethacrylate (number of added moles of ethylene oxide: 9; NK Ester M90G manufactured by Shin-Nakamura Chemical Co., Ltd.)=34% by mole Phosphoric acid mono(2-hydroxyethyl)methacrylic acid ester=46% by mole Phosphoric acid di(2-hydroxyethyl)methacryli acid ester=20% by mole From the viewpoints of fluidity and viscosity reduction, it is favorable to use a mixture of phosphoric acid ester containing the monoester species in the larger amount; however, even in the case of a mixture containing the diester species in the larger amount, when the copolymerization molar ratio to the monomer 1 is controlled, the fluidity or viscosity reduction can be adjusted.

During the copolymerization of monomers, the molar ratio of the monomer 1 and the monomers 2 and 3 is preferably monomer 1/(monomer 2+monomer 3)=5/95 to 95/5, and more preferably 10/90 to 90/10. Further, the molar ratio of the monomer 1 and the monomer 2 and the monomer 3 is preferably monomer 1/monomer 2/monomer 3=5 to 95/3 to 90/1 to 80, and more preferably 5 to 96/3 to 80/1 to 60 (provided that the sum is 100). In addition, for the monomer 2 and monomer 3, the molar ratio or molar percent is to be calculated on the basis of the acid type compound (the same applies to the following).

According to the invention, the proportion of the monomer 3 in the entire monomers used in the reaction can be set to 1 to 60% by mole, and preferably 1 to 30% by mole.

The molar ratio of the monomer 2 and the monomer 3 can be set to monomer 2/monomer 3=99/1 to 4/96, and preferably 99/1 to 5/95.

Hereinafter, more preferred production conditions from the viewpoints of suppression of gelation, adjustment to appropriate molecular weights, and the design of performance of a dispersant for hydraulic compositions, will be described. From such point of view, it is preferable in the invention to use a chain transfer agent during the copolymerization, in an amount of 4% by mole or more, preferably 6% by mole or more, and more preferably 8% by mole or more, based on the total number of moles of the monomers 1 to 3. The upper limit of the amount of use of the chain transfer agent can be set to be preferably 100% by mole or less, more preferably 60% by mole or less, even more preferably 30% by mole or less, and even more preferably 15% by mole or less, relative to the total molar percent of the monomers 1 to 3. More specifically, (1) In the case where n of the monomer 1 is 3 to 30,
 (1-1) if the molar ratio of the monomer 2 and the monomer 3 among the monomers 1 to 3 is 50% by mole or more, it is preferable to use the chain transfer agent in an amount of 6 to 100% by mole, and preferably 8 to 60% by mole, based on the monomers 1 to 3,
 (1-2) if the molar ratio of the monomer 2 and the monomer 3 among the monomers 1 to 3 is less than 50% by mole, it is preferable to use the chain transfer agent in an amount of 4 to 60% by mole, and preferably 5 to 30% by mole, based on the monomers 1 to 3, whereas
(2) in the case where n of the monomer 1 exceeds 30, it is preferable to use the chain transfer agent in an amount of 6 to 50% by mole, and preferably 8 to 40% by mole, based on the monomers 1 to 3.

With regard to the production method of the invention, it is preferable to carry out the method while aiming at a reaction rate for the monomers 2 and 3 of 60% or more, preferably 70% or more, more preferably 80% or more, even more preferably 90% or more, and even more preferably 95% or more. The amount of use of the chain transfer agent can be selected from this point of view. Here, the reaction rate for the monomers 2 and 3 is calculated by the following equation:

$$\text{Reaction rate (\%)} = \left(1 - \frac{Q}{P}\right) \times 100$$

Q: Proportion of the monomer 2 and monomer 3 to X derived from the monomer 1 in the reaction system after completion of the reaction P: Proportion of the monomer 2 and monomer 3 to X derived from the monomer 1 in the reaction system upon initiation of the reaction.

In addition, the proportions (% by mole) of the monomer 2 and monomer 3 in the phosphorus-containing compound in the reaction system upon initiation of the reaction and after completion of the reaction, can be calculated on the basis of the results of $^1$H-NMR measurement.

Furthermore, the first phosphoric acid ester-based polymer of the invention is conceived to have constituent units derived respectively from the monomers 1, 2 and 3, since the double bond derived from the monomer has disappeared when analyzed by $^1$H-NMR under the following conditions.

[$^1$H-NMR Conditions]

A polymer is dissolved in water, dried under reduced pressure, and then dissolved in deuterated methanol at a concentration of 3 to 4% by weight, and $^1$H-NMR is measured. The residual proportion of the double bond is measured from the integration values at 5.5 to 6.2 ppm. Furthermore, the measurement of $^1$H-NMR is performed using "Mercury 400 NMR" manufactured by Varian, Inc. under the conditions of a number of data points of 42052, a measurement range of 6410.3 Hz, a pulse width of 4.5 µs, a pulse delay time of 10 S, and a measurement temperature of 25.0° C.

That is, the first phosphoric acid ester-based polymer of the invention having an Mw as described above contains, as the constituent units, a constituent unit derived from the monomer 1, a constituent unit derived from the monomer 2, and a constituent unit derived from the monomer 3. These constituent units are constituent units derived from the respective monomers, which have been taken into the polymer by ring-opening of the ethylenic unsaturated bonds in the monomers 1, 2 and 3, followed by addition polymerization. The ratios of these constituent units in the polymer depend on the feed ratios, and thus if the monomers used in the copolymerization are only the monomers 1 to 3, the molar ratios of the respective constituent units are considered to be nearly consistent with the feed ratios of the monomers.

From the viewpoint of manifestation of dispersibility, the contents of unreacted monomer 2 and unreacted monomer 3 in the reaction product is preferably 5% by mole or less, more preferably 3% by mole or less, and even more preferably 2% by mole or less, based on the total of the feeding amounts of the monomer 2 and monomer 3.

For the production of the phosphoric acid ester-based polymer according to the invention, other copolymerizable monomers can also be used in addition to the monomers 1 to 3. As the other copolymerizable monomers, a sulfonic acid or carboxylic acid having an unsaturated group, and salts thereof may be mentioned. For example, allylsulfonic acid, methallylsulfonic acid, and an alkali metal salt, an alkaline earth metal salt, an ammonium salt or an amine salt of any one of the two acids may be mentioned. Also, an acrylic acid monomer such as acrylic acid, methacrylic acid, crotonic acid, maleic acid, fumaric acid, itaconic acid or citraconic acid, may be mentioned, and an alkali metal salt, an alkaline earth metal salt, an ammonium salt, an amine salt, a methyl ester or an ethyl ester of at least one of the acids, or an anhydrous compound such as maleic anhydride may also be used. Furthermore, there may be mentioned (meth)acrylamide, N-methyl (meth)acrylamide, N,N-dimethyl (meth)acrylamide, 2-(meth)acrylamide-2-methansulfonic acid, 2-(meth)acrylamide-2-ethanesulfonic acid, 2-(meth)acrylamide-2-propanesulfonic acid, styrene, styrenesulfonic acid and the like. The proportion of the monomers 1 to 3 in total in the total amount of monomers is preferably 30 to 100% by mole, more preferably 50 to 100% by mole, and even more preferably 75 to 100% by mole, and from the viewpoint of achieving the performance as a dispersant as described for the first and second phosphoric acid ester-based polymers of the invention, the proportion is preferably more than 95% by mole to 100% by mole, and more preferably 97 to 100% by mole.

The other copolymerizable monomer may be introduced to the reaction system while being contained in the mixed solution, may be introduced into the reaction system separately with the mixed solution, or may be introduced into the reaction system in a manner combining them.

The total amount of the monomers 1, 2 and 3, and the other copolymerizable monomer in the reaction system is preferably 5 to 80% by weight, more preferably 10 to 65% by weight, and even more preferably 20 to 50% by weight, in the reaction system.

In the production method of the invention, the reaction temperature for the monomers 1, 2 and 3 is preferably 40 to 100° C., and more preferably 60 to 90° C., and the reaction pressure is, as a gauge pressure, preferably 101.3 to 111.5 kPa (1 to 1.1 atm), and more preferably 101.3 to 106.4 kPa (1 to 1.05 atm).

In the production method of the invention, a monomer solution containing the monomer 2 and/or monomer 3, prepared with an appropriate solvent, is subjected to copolymerization with other monomers including the monomer 1, at pH 7 or lower, preferably in the presence of a predetermined amount of a chain transfer agent. Other copolymerizable monomers, a polymerization initiator and the like may also be used.

In the invention, the monomer 1, monomer 2 and monomer 3 are reacted at pH 7 or lower. According to the invention, the pH value at 20° C. of the reaction liquid collected in the middle of the reaction (from the initiation of the reaction to the completion of the reaction) is taken as the pH during the reaction. Usually, it is favorable to initiate the reaction under the conditions (monomer ratio, solvent, other components, etc.) that will certainly lead the pH during the reaction to a value of 7 or lower.

Moreover, in the case where the reaction system is a non-aqueous system, water can be added to the reaction system in an amount enabling pH measurement, and the pH can be measured.

With the monomers 1 to 3 which are the subject matter of the invention, it is believed that if the reaction is performed under the conditions illustrated in the following (1) and (2), under the consideration of conditions other than those, the pH during the reaction will usually become 7 or less. Furthermore, it is acceptable to have instances where the pH transiently exceeds 7 in the early phase of the reaction, within the scope that the reaction in general is not affected, such as in the case where no gelation occurs.

(1) A monomer solution at pH 7 or lower, containing all of the monomers 1 to 3, is used in the copolymerization reaction of the monomers 1 to 3.

(2) The copolymerization reaction of the monomers 1 to 3 is initiated at pH 7 or lower. That is, the reaction system containing the monomers 1 to 3 is adjusted to pH 7 or lower, and then the reaction is initiated.

Specifically, for example, the following production methods may be mentioned.

(i) The pH of a monomer solution containing the monomers 1 to 3 is adjusted to 7 or lower, and the copolymerization reaction is initiated.

(ii) A monomer solution containing the monomers 1 to 3 (the pH may be arbitrary, but is preferably 7 or lower) is added dropwise to the reaction system.

(iii) A monomer solution containing the monomer 1 (the pH may be arbitrary, but is preferably 7 or lower), a monomer solution containing the monomer 2 (the pH may be arbitrary, but is preferably 7 or lower), and a monomer solution containing the monomer 3 (the pH may be arbitrary, but is preferably 7 or lower) are separately added dropwise to the reaction system.

(iv) The methods described above are appropriately combined, and the reaction is performed in a polymerization solvent. For example, a portion of a monomer solution containing the monomers 1 to 3 (the pH may be arbitrary, but is preferably 7 or lower) is first introduced to the reaction system, and the remaining portion of the monomer solution is added dropwise to the reaction system.

In the methods (iii) and (iv), it is necessary to control the conditions for the dropwise addition of the monomer solution to be added dropwise, so that the set values of the molar ratio of monomers are not exceeded. Furthermore, in the methods (ii) to (iv), the other reaction conditions are considered such that the pH of the reaction system containing the monomers 1 to 3 added dropwise is 7 or lower, and preferably 4 or lower.

In addition, the pH of the reaction system can be adjusted, if necessary, using an inorganic acid (phosphoric acid, hydrochloric acid, nitric acid, sulfuric acid, etc.), or NaOH, KOH, triethanolamine or the like.

As discussed in the above, in the invention, it is preferable that the a monomer solution containing at least one of the monomer 2 and the monomer 3 among the monomer solutions used in the reaction, has a pH value of 7 or lower, for the purpose of rendering the pH of the reaction system during the reaction to be 7 or lower. This monomer solution at pH 7 or lower may be a solution containing at least one of the monomer 2 and the monomer 3, or may be a solution containing the monomer 1, or may be a solution containing a chain transfer agent and the other monomers. Here, the monomer solution containing the monomer 2 and/or monomer 3 is preferably a water-containing system (that is, the solvent contains water) from the viewpoint of pH measurement, but if the solution is a non-aqueous system, a necessary amount of water may be added for the measurement. In terms of uniformity of the monomer solution, prevention of gelation and suppression of performance deterioration, the pH is preferably 7 or lower, more preferably 0.1 to 6, and even more preferably 0.2 to 4.5. It is also preferable that the monomer 1 is used as a monomer solution at pH 7 or lower. This pH is a value taken at 20° C.

The pH of the reaction system (polymerization system) prior to the reaction, to which the monomers have been finally introduced, is preferably 6 or lower at 20° C., more preferably 5 or lower, even more preferably 4 or lower, and even more preferably 2 or lower, from the viewpoints of the stability upon controlling the molecular weight of the polymer, and the ease of pH control during the reaction. Preferably, the pH of the monomer solution containing the monomer 2 and/or monomer 3 (pH of the reaction system at the initiation of reaction), the pH of the reaction system in the middle of the reaction, and the pH of the reaction system after the completion of reaction are all 7 or lower.

Moreover, in the case of using these monomers 1 to 3 in a non-water-containing state (that is, the monomers are added dropwise directly as liquid components), the pH of the polymerization system necessarily becomes 7 or lower, and thus this method is also suitable. The pH of the final polymerization system prior to the polymerization is preferably 6 or lower, more preferably 5 or lower, even more preferably 4 or lower, and even more preferably 2 or lower.

[Chain Transfer Agent]

A chain transfer agent is a material which is a function of inducing a chain transfer reaction in radical polymerization (a reaction where a growing polymer radical reacts with another molecule to result in a transfer of the radical active site), and is added for the purpose of transferring the chain bodies.

The chain transfer agent is preferably used in an amount of 4% by mole or more, more preferably 6% by mole or more, and even more preferably 8% by mole or more, based on the total number of moles of the monomers 1 to 3, from the viewpoint of suppression of gelation and adjustment for appropriate molecular weight.

Examples of the chain transfer agent include thiol-based chain transfer agents, halogenated hydrocarbon-based chain transfer agents, and the like, and thiol-based chain transfer agents are preferred.

A thiol-based chain transfer agent preferably has an —SH group, and more preferably, the compound is represented by formula: HS—R-Eg (wherein R represents a group derived from a hydrocarbon having 1 to 4 carbon atoms; E represents an —OH, —COOM, —COOR' or —SO$_3$M group; M represents a hydrogen atom, a monovalent metal, a divalent metal, an ammonium group or an organic amine group; R' represents an alkyl group having 1 to 10 carbon atoms; and g represents an integer from 1 to 2). Examples thereof include mercaptoethanol, thioglycerol, thioglycolic acid, 2-mercaptopropionic acid, 3-mercaptopropionic acid, thiomalic acid, octyl thioglycolate, octyl 3-mercaptopropionate, and the like. From the viewpoint of the chain transfer effect in the copolymerization reaction containing the monomers 1 to 3, mercaptopropionic acid and mercaptoethanol are preferred, and mercaptopropionic acid is more preferred. These may be used individually or in combination of two or more species.

As the halogenated hydrocarbon-based chain transfer agent, carbon tetrachloride, carbon tetrabromide and the like may be mentioned.

Other chain transfer agents include α-methylstyrene dimer, terpinolene, α-terpinene, γ-terpinene, dipentene, 2-aminopropan-1-ol and the like. The chain transfer agents can be used individually or in combination of two or more species.

The chain transfer agent is preferably used as a solution, and it is more preferable to maintain the solution temperature in the range of 10 to 50° C. until the polymerization is initiated. It is even more preferable that the chain transfer agent is added to co-exist in the monomer solution containing the monomer 2 and/or monomer 3 or in the mixed solution of the monomers 1 to 3, and the temperature of the solution is maintained in the range of 10 to 50° C. until the polymerization is initiated.

[Polymerization Initiator]

In the production method of the invention, it is preferable to use a polymerization initiator from the viewpoint of polymerization efficiency such as initiation of polymerization, improvement of reaction rate, shortening of polymerization time, and it is more preferable to use the polymerization initiator in an amount of 5% by mole or more, more preferably 7 to 50% by mole, and even more preferably 10 to 30% by mole, based on the total number of moles of the monomers 1 to 3. The polymerization initiator is preferably introduced to the reaction system separately from the monomer solution containing the monomer 2 and/or monomer 3 or the mixed solution of the monomers 1 to 3.

As a water-based polymerization initiator, an ammonium salt or alkali metal salt of persulfuric acid, hydrogen peroxide, or a water-soluble azo compound such as 2,2'-azobis(2-amidinopropane) dihydrochloride or 2,2'-azobis(2-methylpropionamide) dehydrate is used. Further, a promoting agent such as sodium hydrogen sulfite or an amine compound can also be used in combination with the polymerization initiator.

The production method of the invention is carried out by a solvent polymerization method. The solvent used therein may be water, or a water-soluble organic solvent such as methyl alcohol, ethyl alcohol, isopropyl alcohol, acetone or methyl ethyl ketone. Upon considering the handling and reaction facilities, water is preferred. Particularly in the case of using a water-based solution, it is preferable to perform the copolymerization reaction using the monomer solution containing the monomer 2 and/or monomer 3 in the reaction at pH 7 or lower, preferably at pH 0.1 to 6, and more preferably at pH 0.2 to 4, from the viewpoints of the uniformity of the monomer solution (handling) and the monomer reaction rate, or in terms of suppressing cross-linking by hydrolysis of the pyro species of the phosphoric acid-based compound. For the production method of the invention, the polymerization solvent is preferably used at a ratio of 0.1- to 5-folds by weight, and more preferably 0.5- to 4-folds by weight, based on the total weight of the monomers.

Here, the water-based solution is water or a solution containing 50% by weight or more of water, and a lower alcohol such as methanol or isopropanol, or a ketone such as acetone or methyl ethyl ketone, which can be uniformly mixed with water, may be incorporated therein.

An exemplary production method of the invention will be illustrated. A predetermined amount of water is introduced into a reaction vessel, and nitrogen is sufficiently passed through while stirring. Furthermore, the atmosphere is purged with an inert gas such as nitrogen, and the temperature is elevated. A mixed solution of monomer 1, monomer 2, monomer 3 and a chain transfer agent in water, and a solution of a polymerization initiator in water, both prepared in advance, are provided and are added dropwise to the reaction vessel over 0.5 to 5 hours. At that time, each of the monomers, the chain transfer agent and the polymerization initiator may be separately added dropwise, or it is also possible to preliminarily introduce a mixed solution of the monomers into the reaction vessel, and then add dropwise the polymerization initiator only. That is, the chain transfer agent, polymerization initiator and other additives may be added as an additive solution separately from the monomer solution, or may be mixed into the monomer solution and added. However, from the viewpoint of stability of the polymerization reaction, it is preferable to supply them to the reaction system as an additive solution separately from the monomer solution. In all of the cases, the solution containing the monomer 2 and/or monomer 3 is preferably at pH 7 or lower, and the copolymerization reaction is performed while maintaining the pH at 7 or lower using an acid or the like, preferably followed by aging for a predetermined time. In addition, the polymerization initiator may be added such that the entire amount is simultaneously added dropwise together with the monomers, or may be added in divided portions. However, adding in divided portions is preferred in terms of reducing unreacted monomers. For example, it is preferable that ½ to ⅔ of the total amount of the polymerization initiator that is to be finally used is added simultaneously with the monomers, and after completion of the dropwise addition of the monomers, the system is aged fro 1 to 2 hours, followed by addition of the remaining portion. If necessary, the system is neutralized with an alkaline agent (sodium hydroxide or the like) after completion of the aging, and thus the phosphoric acid ester-based polymer according to the invention is obtained. The production method of the invention is suitable as a method for producing a dispersant for hydraulic compositions containing the phosphoric acid ester-based polymer of the invention.

The phosphoric acid ester-based polymer obtained by the production method of the invention can be used as a dispersant for hydraulic compositions while it is of acid type, but from the viewpoint of suppressing hydrolysis of the ester caused by acidity, it is preferable to convert the polymer into a salt form by neutralization with an alkali. This alkali may be exemplified by an alkali metal salt or a hydroxide of an alkaline earth metal, ammonia, a mono-, di- or trialkanol (preferably having 2 to 6 carbon atoms)-amine, or the like.

According to the production method of the invention, there can be obtained the first phosphoric acid ester-based polymer and the second phosphoric acid ester-based polymer to be described in the following.

<First Phosphoric Acid Ester-Based Polymer>

The first phosphoric acid ester-based polymer of the invention is a phosphoric acid ester-based polymer obtained by copolymerizing a monomer mixture containing the monomer 1, monomer 2 and monomer 3 at pH 7 or lower. Preferred structures of the monomers 1 to 3 are as described in the above.

The first phosphoric acid ester-based polymer of the invention preferably has a weight average molecular weight (hereinafter, indicated as Mw) of 10,000 to 150,000. From the viewpoint of manifestation of the dispersing effect or the viscosity reducing effect, Mw is 10,000 or more, preferably 12,000 or more, more preferably 13,000 or more, even more preferably 14,000 or more, and even more preferably 15,000 or more; and from the viewpoint of an increase in the molecular weight caused by cross-linking, suppression of gelation, or the dispersing effect or the viscosity reducing effect in terms of performance, Mw is 150,000 or less, preferably 130,000 or less, more preferably 120,000 or less, even more preferably 110,000 or less, and even more preferably 100,000. From both above shown viewpoints, Mw is preferably 12,000 to 130,000, more preferably 13,000 to 120,000, even more preferably 14,000 to 110,000, and even more preferably 15,000 to 100,000.

Mw of the first phosphoric acid ester-based polymer of the invention is measured by gel permeation chromatography (GPC) under the following conditions.

[GPC Conditions]
Column: G4000PWXL+G2500PWXL (Tosoh Corp.)
Eluent: 0.2 M phosphoric acid buffer/$CH_3CN$=9/1
Flow rate: 1.0 mL/min
Column temperature: 40° C.
Detection: RI
Sample size: 0.2 mg/mL
Reference material: reduced on the basis of polyethylene glycol In the pattern of a chart showing the molecular weight distribution obtained by the GPC method under the above-described conditions, it is more preferable that the area representing a molecular weight of 100,000 or more corresponds 5% or less of the total area in the chart, from the viewpoint of dispersibility (reduction in the required amount of addition) or the viscosity reducing effect.

<Second Phosphoric Acid Ester-Based Polymer>

The invention provides a phosphoric acid ester-based copolymer obtained by copolymerizing the following (X) and (Y) at pH 7 or lower (second phosphoric acid ester-based polymer). For a preferred structure of the monomer 1 and a preferred structure of the phosphoric acid ester (Y), the description given above may be referred to. Furthermore, it is preferable that the second phosphoric acid ester-based polymer also has an Mw value as described above.

(X) A monomer 1 represented by the above formula (1).

(Y) A phosphoric acid ester obtained by reacting the organic hydroxy compound represented by the above formula (4) with a phosphorylating agent.

m4 in the formula (4) is preferably 1 to 20, more preferably 1 to 10, and even more preferably 1 to 5.

This phosphoric acid ester (Y) is obtained by phosphorylating the organic hydroxy compound represented by formula (4) with a phosphorylating agent.

The phosphorylating agent may be orthophosphoric acid, phosphorus pentoxide (phosphoric anhydride), polyphosphoric acid, phosphorus oxychloride or the like, and orthophosphoric acid or phosphorus pentoxide is preferred. These may be used individually or in combination of two or more species. The phosphorylating agent (Z) to be described later is also preferable. According to the invention, the amount of the phosphorylating agent used in reacting the organic hydroxy compound and the phosphorylating agent, can be appropriately determined at the right time in accordance with the desired phosphoric acid ester composition.

It is preferable that the phosphoric acid ester (Y) is obtained by reacting the organic hydroxy compound and the phosphorylating agent under the conditions such that the ratio defined by the following formula (1) is 2.0 to 4.0, preferably 2.5 to 3.5, and even more preferably 2.8 to 3.2.

[Mole number of water in phosphorylating agent containing $n(H_2O)$ when phosphorylating agent is represented by $P_2O_5 \cdot n(H_2O)$]+[Mole number of organic hydroxy compound]/[Mole number of phosphorylating agent in terms of $P_2O_5$]  (I)

In the invention, with regard to the formula (1), the phosphorylating agent is to be conveniently taken as $P_2O_5 \cdot n(H_2O)$.

In particular, the phosphorylating agent is preferably a phosphorylating agent containing phosphorus pentoxide (Z-1), and at least one (Z-2) selected from water, phosphoric acid and polyphosphoric acid [hereinafter, may be referred to as phosphorylating agent (Z)], and in this case, too, with regard to the formula (1), a phosphorylating agent (Z) containing phosphorus pentoxide (Z-1) and at least one (Z-2) selected from water, phosphoric acid and polyphosphoric acid, is to be conveniently taken as $P_2O_5 \cdot n(H_2O)$.

The mole number of the phosphorylating agent as defined in the formula (1) represents the amount (in moles) of the $P_2O_5$ unit derived from the phosphorylating agent introduced to the reaction system as a raw material, particularly from the phosphorylating agent (Z). The mole number of water represents the amount (in moles) of water ($H_2O$) derived from the phosphorylating agent (Z) introduced to the reaction system as a raw material. That is, the water includes all of the water present in the reaction system containing water, in the case of indicating polyphosphoric acid as ($P_2O_5 \cdot xH_2O$) and orthophosphoric acid [½($P_2O_5 \cdot 3H_2O$)].

Furthermore, the temperature at which the phosphorylating agent is added to the organic hydroxy compound is preferably 20 to 100° C., and more preferably 40 to 90° C. The time required for the addition of the phosphorylating agent to the reaction system (time taken from the initiation of addition to the completion of addition) is preferably 0.1 hours to 20 hours, and more preferably 0.5 hours to 10 hours.

The temperature of the reaction system after completion of the introduction of phosphorylating agent is preferably 20 to 100° C., and more preferably 40 to 90° C. In addition, the copolymerization can be performed on the basis of the method for producing the phosphoric acid ester-based polymer described above.

After the completion of phosphorylation reaction, the condensate of the generated phosphoric acid (organic compound or phosphoric acid having a pyrophosphoric acid bond) may be reduced by hydrolysis, and even if hydrolysis is not performed, the condensate is suitable as the monomer for the production of the phosphoric acid ester-based polymer of the invention.

The method for producing a phosphoric acid ester-based polymer of invention (I) relates to a method for producing a phosphoric acid ester-based polymer, the method containing copolymerizing the monomer 1 represented by the formula (1), the monomer 2 represented by the formula (2), and the monomer 3 represented by the formula (3) at pH 7 or lower, in a polymerization solvent having a dissolved oxygen concentration at 25° C. of 0.01 to 4.0 mg/kg. Embodiments of the invention (I) will be described in detail.

In invention (I), the proportion of the monomer 3 can be set to 1 to 60% by mole among all of the monomers used in the reaction.

Furthermore, the molar ratio of the monomer 2 and the monomer 3 can be set to monomer 2/monomer 3=99/1 to 4/96.

Since a monomer raw material containing the monomer 3 in such range is generally expected to exhibit significant gelation, the monomer raw material is usually considered to be unsuitable as the raw material for the production of polymer for the dispersant for hydraulic compositions. However, in invention (I), when the monomers are reacted at pH 7 or lower, in a polymerization solvent having a dissolved oxygen concentration at 25° C. of 0.01 to 4.0 mg/kg, gelation is suppressed, and thus a phosphoric acid ester-based polymer which is suitable as a dispersant for hydraulic compositions, can be stably produced in an industrially practical level with good reproducibility.

In the production method of invention (I), a monomer solution containing the monomer 2 and/or monomer 3 prepared with an appropriate solvent, is copolymerized with other monomers including the monomer 1 at pH 7 or lower, in a polymerization solvent having a dissolved oxygen concentration at 25° C. of 0.01 to 4.0 mg/kg, preferably in the presence of a predetermined amount of a chain transfer agent. Further, other copolymerizable monomers or polymerization initiators may also be used.

In invention (I), the monomer 1, monomer 2 and monomer 3 are reacted at pH 7 or lower, in a polymerization solvent having a dissolved oxygen concentration at 25° C. of 0.01 to 4.0 mg/kg. In invention (I), the dissolved oxygen concentration at 25° C. is the concentration at the time of initiation of the reaction, and the pH at 20° C. of the reaction liquid collected in the middle of the reaction (from the initiation of reaction to the completion of reaction) is taken as the pH during the reaction. Typically, it is favorable to initiate the reaction under the conditions (monomer ratio, solvent, other components, etc.) that will certainly lead the pH during the reaction to a value of 7 or lower.

Specifically, for example, the following production methods may be mentioned.

(i') The pH of a monomer solution containing the monomers 1 to 3 is adjusted to 7 or lower, and the copolymerization reaction is initiated.

(ii') A monomer solution containing the monomers 1 to 3 (the pH may be arbitrary, but is preferably 7 or lower) is added dropwise to the reaction system (a polymerization solvent having a dissolved oxygen concentration at 25° C. of 0.01 to 4.0 mg/kg).

(iii') A monomer solution containing the monomer 1 (the pH may be arbitrary, but is preferably 7 or lower), a monomer solution containing the monomer 2 (the pH may be arbitrary, but is preferably 7 or lower), and a monomer solution containing the monomer 3 (the pH may be arbitrary, but is preferably 7 or lower) are separately added dropwise to the reaction system (a polymerization solvent having a dissolved oxygen concentration at 25° C. of 0.01 to 4.0 mg/kg).

(iv') The methods described above are appropriately combined, and the reaction is performed in a polymerization solvent having a dissolved oxygen concentration at 25° C. of 0.01 to 4.0 mg/kg. For example, a portion of a monomer solution containing the monomers 1 to 3 (the pH may be arbitrary, but is preferably 7 or lower) is first introduced to the reaction system, and the remaining portion of the monomer solution is added dropwise to the reaction system.

In invention (I), a polymerization solvent having a dissolved oxygen concentration at 25° C. of 0.01 to 4.0 mg/kg, preferably 0.05 to 2.5 mg/kg, is used. Here, the dissolved oxygen concentration refers to the concentration measured by a fluorescence oxygen sensor (FO-960: manufactured by A.S.R. Co., Ltd.) at 25° C. In addition, in the case of performing nitrogen purging or the like after adding the monomers to the polymerization solvent, the dissolved oxygen concentration is taken for a system containing also the monomers. In addition, a water-based solution is water or a solution containing 50% by weight of water, and a lower alcohol such as methanol or isopropanol, or a ketone such as acetone or methyl ethyl ketone, which can be uniformly mixed with water, may be mixed therein.

The adjustment of the dissolved oxygen concentration of the polymerization solvent may be performed at the polymerization reaction tank, or a solvent in which the amount of dissolved oxygen has been adjusted in advance may be used. In these cases, the adjustment can be performed by a method of sufficiently passing nitrogen while stirring, a method of sufficiently repeating pressure reduction and nitrogen purging, or the like. From the viewpoint of operation efficiency, it is preferable to mix nitrogen within a pipe for transporting the polymerization solvent to the polymerization vessel to adjust the dissolved oxygen concentration, and it is more preferable to install a static mixer in the middle of the pipe. As for this static mixer, a commercially available mixer such as New Static Mixer (manufactured by Tokyo Nisshin Jabara Co., Ltd.), Ramond Supermixer (manufactured by Kankyokagaku Corp.), or Noritake Static Mixer (manufactured by Noritake Co., Ltd.) can be used.

It is preferable to maintain the dissolved oxygen concentration at 25° C. to 0.01 to 4.0 mg/kg by nitrogen purging or the like, until the polymerization reaction is completed.

In invention (I), it is preferable to initiate the reaction using a polymerization solvent having a dissolved oxygen concentration at 25° C. of 0.01 to 4.0 mg/kg, and to perform the reaction in an inert gas atmosphere, for example, in a nitrogen atmosphere, so as to maintain this dissolved oxygen concentration during the reaction. It is also preferable to purge the atmosphere with an inert gas before the reaction. In the case of using nitrogen gas as the inert gas, when nitrogen gas is introduced into the reaction tank during the reaction at a proportion of 0.01 to 0.3 L/hr per 1 L of the gaseous phase, the dissolved oxygen concentration in the polymerization solvent is maintained within the aforementioned range. Such operation is considered to allow suppression of the occurrence of cross-linking (increase in molecular weight, gelation) even though raw materials including diester species are used, so that the excellent performance of the phosphoric acid ester-based polymer as a dispersant for hydraulic compositions, and thus is considered to be more preferable for the production method of the invention.

In addition, the dissolved oxygen concentration in the polymerization solvent during the reaction does not need any special detection since the concentration is maintained almost the same as that at the time of reaction initiation under such introduction of an inert gas as described above; however, it is also possible to directly measure the dissolved oxygen concentration in the polymerization solvent during the reaction using an appropriate measuring means. For example, an apparatus equipped with a dissolved oxygen sensor electrode which is resistant to acid, can be used in the measurement of the dissolved oxygen concentration in the polymerization solvent during the reaction even in the pH region of the invention.

A more preferred production conditions from the viewpoints of suppression of gelation, adjustment to appropriate molecular weights, and the design of performance of a dispersant for hydraulic compositions, will be described. From such point of view, it is preferable in the invention to use a chain transfer agent during the copolymerization in an amount of 4% by mole or more, more preferably 6% by mole or more, and even more preferably 8% by mole or more, based on the total number of moles of the monomers 1 to 3. The upper limit of the amount of use of the chain transfer agent can be set to preferably 100% by mole or less, more preferably 60% by mole or less, even more preferably 30% by mole or less, and even more preferably 15% by mole or less, based on the total number of moles of the monomers 1 to 3. Overall, the amount of use of the chain transfer agent is preferably 4 to 100% by mole, more preferably 6 to 60% by mole, and even more preferably 8 to 30% by mole.

An example of the production method in invention (I) will be illustrated. A predetermined amount of water is introduced into a reaction vessel, then the dissolved oxygen concentration in the water at 25° C. is adjusted to 0.01 to 4.0 mg/kg by sufficiently passing nitrogen under stirring, sufficiently repeating a pressure reduction and a nitrogen purging or the like, and the atmosphere is purged with an inert gas such as nitrogen, while the temperature is elevated. Subsequently, a mixed solution of the monomer 1, monomer 2, monomer 3 and a chain transfer agent in water, and a solution of a polymerization initiator in water, both prepared in advance, are provided and subjected to a process of adding these solutions dropwise to the reaction vessel over 0.5 to 5 hours.

Invention (I) provides a phosphoric acid ester-based polymer obtained by copolymerizing the monomer 1, monomer 2 and monomer 3 at pH 7 or lower in a polymerization solvent having a dissolved oxygen concentration at 25° C. of 0.01 to 4.0 mg/kg (first phosphoric acid ester-based polymer). Preferred structures of the monomers 1 to 3 are as described in the above.

Furthermore, invention (I) provides a phosphoric acid ester-based copolymer obtained by copolymerizing the (X) and (Y) described above at pH 7 or lower, in a polymerization solvent having a dissolved oxygen concentration at 25° C. of 0.01 to 4.0 mg/kg (second phosphoric acid ester-based polymer). For a preferred structure of the monomer 1 and a preferred structure of the phosphoric acid ester (Y), the description in the above may be referred to. It is preferable that the second phosphoric acid ester-based polymer has an Mw value as described above.

The method for producing a phosphoric acid ester-based polymer of invention (II) is a method for producing a phosphoric acid ester-based polymer, the method containing copolymerizing a monomer 1 represented by the formula (1), a monomer 2 represented by the formula (2), and a monomer 3 represented by the formula (3) at pH 7 or lower in the presence of a phosphonic acid chelating agent. Embodiments of invention (II) will be described.

The method for producing a phosphoric acid ester-based polymer of invention (II) relates to a method for producing a phosphoric acid ester-based polymer, the method containing copolymerizing a monomer 1 represented by the formula (1), a monomer 2 represented by the formula (2), and a monomer 3 represented by the formula (3) at pH 7 or lower in the presence of a phosphonic acid chelating agent.

In an industrial method for polymer production, when transition metal ions (iron ions, etc.) are incorporated to a polymerization reaction system, polymerization is initiated by means of complexes, and polymerization proceeds, thus resulting in fluctuation in the molecular weight. The incorporation of transition metal ions (iron ions) can be conceived to originate from the monomer raw materials, diluent water, the corrosion of the raw material storage tank, reaction tank, and pipes, or the like, but the amount of incorporation is hard to predict. Even in such case, the fluctuation in the molecular weight can be suppressed in the invention, by performing polymerization in the presence of a phosphonic acid-based chelating agent.

In the case of producing the phosphoric acid ester-based polymer according to the invention using a water-soluble thiol compound as a chain transfer agent, the resulting copolymer is subjected to deactivation of the water-soluble thiol compound in order to reduce foul odor or putrefaction. The deactivation treatment can be carried out by adding hydrogen peroxide to the reaction product, and thereby the problem of foul odor or putrefaction is eliminated. On the other hand, there are cases where addition of hydrogen peroxide leads to a reaction between the hydrogen peroxide and transition metal atoms, and then a cross-linking reaction proceeds, thus leading to the fluctuation in the molecular weight. The fluctuation in the molecular weight generated by such mechanism also can be suppressed by polymerization in the presence of a phosphonic acid-based chelating agent, as in the case of the invention.

Furthermore, in the invention, the proportion of the monomer 3 can be set to 1 to 60% by mole of the total amount of monomers.

The molar ratio of the monomer 2 and the monomer 3 can be set to monomer 2/monomer 3=99/1 to 4/96.

Since the monomer raw material containing the monomer 3 in the range as such is generally expected to be accompanied by significant gelation, the monomer raw material is usually conceived to be unsuitable as the raw material in the production of a polymer as a dispersant for hydraulic compositions. However, in invention (II), when the reaction is performed at pH 7 or lower in the presence of a phosphonic acid-based chelating agent, gelation is suppressed, and thus a phosphoric acid ester-based polymer suitable as a dispersant for hydraulic compositions can be produced stably in an industrially practical level with good reproducibility.

In invention (II), phosphonic acid chelating agents are used, from the viewpoint that the agents have a high chelating ability and can capture transition metal ions in the polymerization reaction system, even in a small amount thereof. These are preferably phosphonic acids represented by the following formulas (a) to (d), or salts thereof.

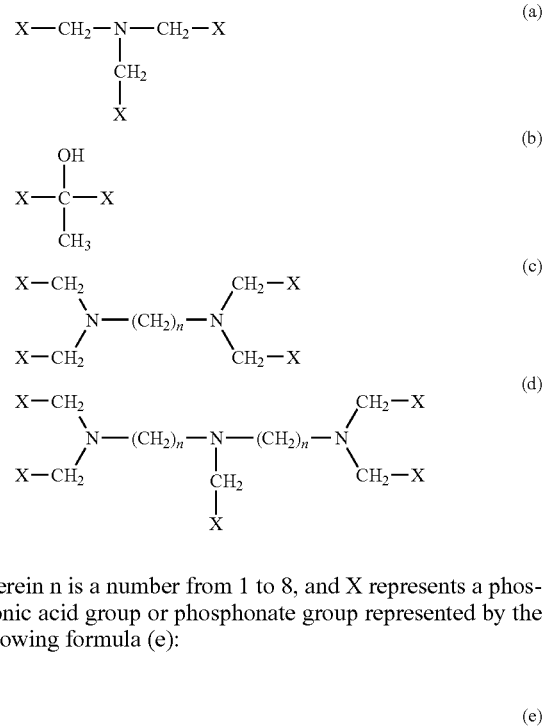

wherein n is a number from 1 to 8, and X represents a phosphonic acid group or phosphonate group represented by the following formula (e):

$$\begin{array}{c} \text{O} \\ \parallel \\ -\text{P}-\text{OM} \\ | \\ \text{OM}' \end{array} \quad (e)$$

and M and M' each independently represent a hydrogen atom, an alkali metal, an alkaline earth metal, ammonium, or mono-, di- or trialkylammonium which may be substituted with a hydroxyl group.

Among them, the compounds of formulas (a), (c) and (d) are preferred, and the compounds of formulas (c) and (d) are more preferred, while the compounds for formulas (c) and (d) wherein n=2 are even more preferred. Furthermore, M and M' (counterions) in the phosphonate group represented by formula (e) are each preferably a hydrogen atom, sodium or potassium. These compounds represented by formulas (a) to (d) are available as, for example, the "DEQUEST" series of Solutia, Inc., specifically, Dequest 2006 [aminotri(methylenephosphonic acid) pentasodium salt], Dequest 2010 (1-hydroxyethylidene-1,1-diphosphonic acid), Dequest 2041 [ethylenediaminetetra(methylenephosphonic acid)], Dequest 2066 (diethyelnetriaminepenta(methylenephosphonic acid) heptasodium salt), or the like.

In the invention (II), the phosphonic acid chelating agent is preferably added at a ratio of 1 to 10000 mg/kg, more preferably 50 to 800 mg/kg, based on the polymerization reaction system. The time for addition may be either before the reaction or during the reaction, but it is preferable to add the agent before the reaction.

In the production method of invention (II), a monomer solution containing the monomer 2 and/or monomer 3 prepared with an appropriate solvent is copolymerized with other monomers including the monomer 1 at pH 7 or lower, in the presence of a phosphonic acid-based chelating agent, and preferably in the presence of a predetermined amount of a chain transfer agent. Other copolymerizable monomers, a polymerization initiator or the like may also be used.

In the invention, the monomer 1, monomer 2 and monomer 3 are allowed to react at pH 7 or lower in the presence of a phosphonic acid-based chelating agent, from the viewpoints of uniformity of the monomer solution, prevention of gelation, and suppression of performance deterioration. In the invention, the pH at 20° C. of the reaction liquid collected in the middle of the reaction (from the initiation of reaction to the completion of reaction) is taken as the pH during the reaction. Usually, it is favorable to initiate the reaction under the conditions (monomer ratio, solvent, other components, etc.) that will certainly lead the pH during the reaction to a value of 7 or lower.

More preferred conditions for production from the viewpoint of suppression of gelation, adjustment to appropriate molecular weights, and the design of performance of a dispersant for hydraulic compositions, will be described. From such point of view, in the invention, it is preferable to use a chain transfer agent during the copolymerization, in an amount of 4% by mole or more, more preferably 6% by mole or more, and even more preferably 8% by mole or more, based on the total number of moles of the monomers 1 to 3. Furthermore, the upper limit of the amount of use for the chain transfer agent can be set preferably to 100% by mole or less, more preferably 60% by mole or less, even more preferably 30% by mole or less, and even more preferably 15% by mole or less, based on the total number of moles of the monomers 1 to 3. The overall amount of use of the chain transfer agent is preferably 4 to 100% by mole, more preferably 6 to 60% by mole, and even more preferably 8 to 30% by mole.

In invention (II), it is preferable to have a process for treating the copolymerization reaction product with hydrogen peroxide. As described above, particularly in the case of using a chain transfer agent such as a water-soluble thiol compound, the process is preferable because the process deactivates the compound. The amount of use of hydrogen peroxide is preferably 50 to 3000 mg/kg, and more preferably 100 to 1800 mg/kg, based on the copolymerization product (approximate to the polymerization reaction system).

An exemplary production method of invention (II) will be illustrated. A predetermined amount of water is introduced into a reaction vessel, a predetermined amount of a phosphonic acid chelating agent is added, and then the atmosphere is purged with an inert gas such as nitrogen, while the temperature is elevated. Subsequently, a mixed solution of the monomer 1, monomer 2, monomer 3 and a chain transfer agent in water, and a solution of a polymerization initiator in water, both prepared in advance, are provided and subjected to a process of adding these solutions dropwise to the reaction vessel over 0.5 to 5 hours.

Invention (II) provides a phosphoric acid ester-based polymer obtained by copolymerizing a monomer mixture containing the monomer 1, monomer 2 and monomer 3 at pH 7 or lower in the presence of a phosphonic acid chelating agent (first phosphoric acid ester-based polymer). Preferred structures of the monomers 1 to 3 are as described in the above.

Invention (II) also provides a phosphoric acid ester-based copolymer obtained by copolymerizing the (X) and (Y) described above at pH 7 or lower in the presence of a phosphonic acid-based chelating agent (second phosphoric acid ester-based polymer). For a preferred structure of the monomer 1 and a preferred structure of the phosphoric acid ester (Y), the description in the above may be referred to. It is also preferable that the second phosphoric acid ester-based polymer has an Mw value as described above.

The method for producing a phosphoric acid ester-based polymer of invention (III) is a method for producing a phosphoric acid ester-based polymer using a mixed solution containing a monomer 1 represented by the formula (1), a monomer 2 represented by the formula (2) and a monomer 3 represented by the formula (3), wherein the mixed solution is obtained by mixing the monomers 1 to 3 at a temperature of 10 to 50° C., polymerization is initiated within 72 hours after mixing the monomers 1 to 3, and the temperature of the mixed solution is maintained in the range of 10 to 50° C. until the time that polymerization is initiated.

Invention (III) relates to a method for producing a phosphoric acid ester-based polymer, the method containing preparing a mixed solution containing the monomer 1, monomer 2 and monomer 3 by mixing these monomers at a temperature of 10 to 50° C., and maintaining the temperature of the mixed solution in the range of 10 to 50° C. until the time that a polymerization reaction is initiated.

Embodiments of invention (III) will be described in detail.

As for the monomers 1 to 3 which are subject to invention (III), a mixed solution containing all of the monomers 1 to 3 is used in the copolymerization reaction of the monomers 1 to 3. At that time, under consideration of other conditions, it is preferable to set the pH during the reaction to a value of 7 or lower. Thus, it is preferable that the pH value of the mixed solution is 7 or lower. Furthermore, it is acceptable to have instances where the pH transiently exceeds 7 in the early phase of the reaction, within the scope that the reaction in general is not affected, such as in the case where no gelation occurs.

In invention (III), it is preferable that the pH value of the mixed solution is 7 or lower, for the purpose of rendering the pH of the reaction system during the reaction to be 7 or lower. Here, the mixed solution is preferably a water-containing system (that is, the solvent contains water) from the viewpoint of pH measurement, but if the solution is a non-aqueous system, a necessary amount of water may be added for the measurement. In terms of uniformity of the monomer solution, prevention of gelation and suppression of performance deterioration, the pH is preferably 7 or lower, more preferably 0.1 to 6, and even more preferably 0.2 to 4.5.

In the production method of invention (III), the monomers 1 to 3 are mixed at 10 to 50° C. to prepare a mixed solution (mixing step), and polymerization of the mixed solution is performed (polymerization step). Meanwhile, the temperature of the mixed solution is maintained at 10 to 50° C. until the time that polymerization is initiated. That is, the invention relates to a production method containing maintaining the monomers 1 to 3 at a temperature of 10 to 50° C. (left to stand in an environment at the temperature), from the time that the three parties of the monomers 1 to 3 come to co-presence to the time that polymerization is initiated, and performing a polymerization reaction. In the case where the components to form a mixed solution have been heated, the components which have reached 10 to 50° C. are used. For example, it is preferable in view of handlability that the monomer 1 is used after being heated and dissolved in water, and in that case, the solution of monomer 1 is cooled to 10 to 50° C. and then used in the mixing with the monomers 2 and 3. It is also preferable the solvent used in the production of the mixed solution is also adjusted to a temperature of 10 to 50° C. in advance, and then used in mixing. When the mixing temperature is 10° C. or above, the possibility that the congealing point of the monomer 1 would appear is low, and when the mixing temperature is 50° C. or below, hydrolysis of the monomers 2 and 3 can be suppressed, and the dispersing effect and viscosity reducing effect of the resulting phosphoric acid ester-based polymer are enhanced.

In invention (III), it is preferable that the temperature of all of the components used in obtaining a mixed solution, including the monomers 1 to 3, the solvent, the chain transfer agent and the like, is in the range of 10 to 50° C.

It is also preferable that the temperature of the mixed solution is maintained at 10 to 45° C., and more preferably 10 to 35° C., until the time that polymerization is initiated. In addition, the temperature for preparing the mixed solution and the temperature to be maintained until the initiation of polymerization may be the same or different.

It is preferable that the mixed solution is prepared by mixing a solution containing the monomer 1 and a solution containing the monomer 2 and monomer 3. There, the temperature of each of the solutions is preferably 10 to 50° C.

The temperature of the mixed solution before the initiation of reaction is preferably a temperature being not higher than the cloud point. When used at a temperature of the cloud point or lower, the monomer distribution in the reaction system gets uniform and high molecular weight-having ones are partially generated. Thus, only the same monomer component can be suppressed from being polymerized and a polymer having the intended composition ratio can be obtained.

The mixed solution preferably has a viscosity of 500 mPa·s or less, for the purpose of making the introduction (for example, dropwise addition) to the reaction system easier. It is preferable to adjust such viscosity by diluting with water, and from the viewpoint of uniform solubility or dispersibility at the time of introduction to the reaction system, the viscosity is more preferably 300 mPa·s and even more preferably 200 mPa·s.

Furthermore, the mixed solution is subjected to the initiation of polymerization within 72 hours after the preparation, from the viewpoint of suppressing hydrolysis of the monomers. For example, it is preferable to introduce the mixed solution to the reaction system containing water within 72 hours. Introduction within 48 hours is more preferred, and introduction within 24 hours is even more preferred.

The solvent of the mixed solution may be water, or a water-solvent-based medium containing water and methanol, ethanol, isopropanol, acetone, methyl ethyl ketone or the like. The solvent may be identical to or different from the solvent used in the reaction system, but is preferably selected under consideration of the effect of introduction of the mixed solution. It is even more preferable that the solvent of the mixed solution and the solvent of the reaction system are identical.

In an industrial polymerization reaction, the incorporation of transition metal ions to the reaction system is conceived to originate from the monomer raw materials, diluent water, the corrosion of the raw material storage tank, reaction tank or pipes, or the like, but the amount of incorporation is hard to predict. Therefore, in the invention, it is preferable to conduct polymerization in the presence of a chelating agent. Using a chelating agent is also preferable in view of suppressing fluctuation in the molecular weight.

The chelating agent used in the invention is preferably phosphonic acid or a salt thereof, from the viewpoint of having a high chelating ability even in a small amount thereof.

According to the invention, the chelating agent is preferably added at a ratio of 1 to 10000 mg/kg, and more preferably 50 to 800 mg/kg, based on the polymerization reaction system. The chelating agent is preferably introduced into the reaction system while being contained in the mixed solution, and the amount of the agent to be contained in the polymerization reaction may be the entire amount or a portion of the final feeding amount, while it is preferable that the entire amount is contained.

More preferred production conditions from the viewpoints of suppression of gelation, adjustment to appropriate molecular weights, and the design of performance of a dispersant for hydraulic compositions, will be described. From such point of view, it is preferable in the invention to use a chain transfer agent during the copolymerization, in an amount of 4% by mole or more, preferably 6% by mole or more, and more preferably 8% by mole or more, based on the total number of moles of the monomers 1 to 3. The upper limit of the amount of use of the chain transfer agent can be set to be preferably 100% by mole or less, more preferably 60% by mole or less, even more preferably 30% by mole or less, and even more preferably 15% by mole or less, relative to the total molar percent of the monomers 1 to 3. Overall, the amount of use of the chain transfer agent is preferably 4 to 100% by mole, more preferably 6 to 60% by mole, and even more preferably 8 to 30% by mole.

An exemplary production method of the invention will be illustrated. A predetermined amount of water is introduced into a reaction vessel, and the atmosphere is purged with an inert gas such as nitrogen, while the temperature is elevated. A mixed solution of the monomers 1 to 3 and a chain transfer agent, mixed and dissolved in water at a predetermined temperature, and a solution of a polymerization initiator in water are prepared in advance. They are dropwise added to the reaction vessel is initiated within 72 hours after the preparation of the monomer polymerization solution. Furthermore, the dropwise addition is performed over 0.5 to 5 hours. The dropwise addition is preferably completed within 72 hours after the preparation of the monomer mixed solution. It is more preferably the dropwise addition is completed within 48 hours, and even more preferably within 24 hours. The temperature of the mixed solution is maintained at 10 to 50° C., while waiting for the dropwise addition. There, the mixed solution is preferably at pH 7 or lower, from the viewpoint of the uniformity of the monomer solution, prevention of gelation and suppression of performance deterioration. Furthermore, a copolymerization reaction is performed, while maintaining the pH value preferably at 7 or lower by means of an alkali agent, and preferably aging is performed for a predetermined time.

Invention (III) provides a phosphoric acid ester-based polymer obtained by a production method using a mixed solution containing the monomer 1, monomer 2 and monomer 3, wherein the mixed solution is obtained by mixing the monomers 1 to 3 at a temperature of 10 to 50° C., polymerization is initiated within 72 hours after the mixing of the monomers 1 to 3, and the temperature of the mixed solution is maintained in the range of 10 to 50° C. until the time that polymerization is initiated. Preferred structures of the monomers 1 to 3 are as described above.

Invention (III) also provides a phosphoric acid ester-based copolymer (second phosphoric acid ester-based polymer) obtained by a production method using a mixed solution containing the components (X) and (Y) described above, wherein the mixed solution is obtained by mixing at a temperature of 10 to 50° C., polymerization is initiated within 72 hours after mixing the components (X) and (Y), and the temperature of the mixed solution is maintained in the range of 10 to 50° C. until polymerization is initiated. For a preferred structure of the monomer 1 and a preferred structure of the phosphoric acid ester (Y), the description given above may be referred to. It is preferable that the second phosphoric acid ester-based polymer also has an Mw value as described above.

Invention (IV) relates to the production method described above, the method containing adding 50 to 3000 mg of hydrogen peroxide relative to 1 kg of the reaction liquid after the copolymerization reaction, and then adding 100 to 3000 mg of a preservative relative to 1 kg of the reaction liquid.

Invention (IV) relates to a method for producing a phosphoric acid ester-based polymer, the method containing copolymerizing a monomer 1 represented by the formula (1) (hereinafter, referred to as monomer 1), a monomer 2 represented by the formula (2) (hereinafter, referred to as monomer 2), and a monomer 3 represented by the formula (3) by a solution polymerization method in the presence of a chain transfer agent, wherein 50 to 3000 mg of hydrogen peroxide and 100 to 3000 mg of a preservative, relative to 1 kg of the reaction liquid after the copolymerization reaction, are added.

According to the production method of invention (IV), a phosphoric acid ester-based polymer can be obtained. A dispersant of the polymer can impart an excellent dispersing effect and a viscosity reducing effect to a hydraulic composition containing a hydraulic powder. Furthermore, when the residual chain transfer agent is deactivated with hydrogen peroxide, the preservative effectively exhibits its effect so that a phosphoric acid ester-based polymer which can be stably stored without putrefying is obtained.

Invention (IV) of the present invention relates to a method for producing a phosphoric acid ester-based polymer, the method containing copolymerizing the monomer 1, monomer 2 and monomer 3 by a solution polymerization method in the presence of a chain transfer agent, wherein 50 to 3000 mg of hydrogen peroxide and 100 to 3000 mg of a preservative, relative to 1 kg of the reaction liquid after the copolymerization reaction, are added.

The phosphoric acid ester-based polymer of the invention can be produced according to the production method of invention (I), (II), (III) or (V).

The inventors of the present invention found that a polymer derived from a specific phosphoric acid ester is useful in reducing the viscosity of a hydraulic composition. However, in the case where such a polymer is stored after production and then used, putrefaction caused by anaerobic bacterial or foul odor caused by the thiol used in the production may occur. The production method of invention (IV) can prevent these without affecting the effect of reducing the viscosity of a hydraulic composition.

In the production method of invention (IV), when the monomer 1 is copolymerized with the monomer 2 which is a phosphoric acid ester monomer, or with the monomer 2 and monomer 3, by a solution polymerization method in the presence of a chain transfer agent (copolymerization step), and hydrogen peroxide and a preservative are added in specific amounts (post-treatment step), putrefaction or generation of foul odor is suppressed, and the excellent performance of the phosphoric acid ester-based polymer as a dispersant for hydraulic compositions can be maintained. Therefore, the production method serves as a very advantageous production method in the field of hydraulic composition. In the production method of invention (IV), when 50 to 3000 mg of hydrogen peroxide per 1 kg of the reaction liquid is added to the reaction liquid after the copolymerization reaction, the residual chain transfer agent is deactivated, and thus the effect of adding a preservative is not impaired.

The production method of invention (IV) includes a process of adding hydrogen peroxide to the reaction liquid after the copolymerization reaction. The addition of hydrogen peroxide may be carried out either before or after the neutralization of the copolymer, but after the neutralization is preferred. The pH of the reaction liquid to which hydrogen peroxide is added is preferably in the range of 4.5 to 7.0, from the viewpoint that the chain transfer agent can be completely deactivated. Hydrogen peroxide is added at a ratio of 50 to 3000 mg/kg based on the reaction liquid, and is preferably added at a ratio of 50 to 2500 mg/kg, more preferably 80 to 2000 mg/kg, and even more preferably 100 to 1800 mg/kg. When the amount of hydrogen peroxide is in this range, the residual chain transfer agent can be completely deactivated, and the effect of adding a preservative is not impaired. Furthermore, excess hydrogen peroxide is decomposed during storage, and there is no risk of the generation of oxygen gas. The treatment using hydrogen peroxide can be performed by adding aqueous hydrogen peroxide at a predetermined concentration to the reaction liquid, and maintaining the reaction liquid at a predetermined temperature (preferably, 40 to 90° C.) for a predetermined time (preferably, 0.5 to 2.0 hours). From the viewpoint that the chain transfer agent can be completely deactivated, the temperature of the reaction liquid to which hydrogen peroxide is added is preferably 50 to 70° C., and it is also preferable to agitate the reaction liquid for 20 to 30 minutes after adding hydrogen peroxide.

In addition, the term "after the copolymerization reaction" refers to the time point at which the residual amount of the monomers 1 to 3 in total is 10% by mole or less of the total amount of monomers (reaction rate of 90% or more), and preferably refers to the time point corresponding to 5% by mole or less, and more preferably 3% by mole or less.

The residual amount of hydrogen peroxide in the final reaction liquid is preferably less than 100 gm/kg, from the viewpoint of suppressing the generation of oxygen gas.

In invention (IV), hydrogen peroxide is added to the reaction liquid and mixed, and then 100 to 3000 mg of a preservative relative to 1 kg of the reaction liquid is added. The amount of addition of the preservative is preferably 200 to 2500 mg, more preferably 300 to 2000 mg, and even more preferably 500 to 1500 mg, relative to 1 kg of the reaction liquid, in view of the sustainability of the preservative effect. In invention (IV), since the chain transfer agent is deactivated by hydrogen peroxide, even in the case of using a thiazoline-based preservative which is considered to have difficulties in exhibiting the effect in the presence of a chain transfer agent having a high preservative effect, a sufficient preservative effect is obtained. Because of this, it is preferable to use thiazoline-based preservatives as the preservative. Examples of the thiazoline-based preservative include 2-methyl-4-isothiazolin-3-one, 5-chloro-2-methyl-4-isothiazolin-3-one, 2-octyl-4-isothiazolin-3-one, 1,2-benzimsothiazolin-3-one, 2-methyl-4,5-trimethylene-4-isothiazolin-3-one and the like, and these are preferably used individually or in combination of a plurality. Specifically, Topside 240, Topside 250 (manufactured by Permachem Asia, Ltd.), Fineside C-7A, Fineside C-3800 (manufactured by Tokyo Fine Chemical Co., Ltd.), and the like may be mentioned.

From the viewpoint that it is suitable for sustaining a preservative effect, the temperature of the reaction liquid to which the preservative is added is preferably 20 to 40° C., and it is preferable to agitate the reaction liquid for 10 to 20 minutes after adding the preservative.

An exemplary production method of invention (IV) will be illustrated. A copolymerization reaction is performed by the production method of invention (I), invention (II), invention (III) or invention (V), and preferably aging is performed for predetermined time. According to necessity, the reaction liquid is further neutralized with an alkali agent (sodium hydroxide, etc.) after completion of the aging, and a post-treatment using hydrogen peroxide is performed. Further, addition of a preservative is carried out to obtain the phosphoric acid ester-based polymer according to the present invention. The production method of the invention is suitable as a method for producing a dispersant for hydraulic compositions containing the phosphoric acid ester-based polymer.

Invention (IV) provides a method of producing a phosphoric acid ester-based polymer by copolymerizing a monomer 1 with monomer 2 or a mixed monomer of monomer 2 and monomer 3 by a solution polymerization method in the presence of a chain transfer agent and provides a phosphoric acid ester-based polymer (first phosphoric acid ester-based polymer) obtained by adding 50 to 3000 mg of hydrogen peroxide and 100 to 3000 mg of a preservative relative to 1 kg of the reaction liquid after the copolymerization reaction. Preferred structures of the monomers 1 to 3 are as described above.

Furthermore, invention (IV) of the present invention provides a method of producing a phosphoric acid ester-based copolymer by copolymerizing the following (X) and (Y) by a solution polymerization method in the presence of a chain transfer agent and provides a phosphoric acid ester-based copolymer (second phosphoric acid ester-based polymer) by adding 50 to 3000 mg of hydrogen peroxide and 100 to 3000 mg of a preservative relative to 1 kg of the reaction liquid after the copolymerization reaction. For a preferred structure of the monomer 1 and a preferred structure of the phosphoric acid ester (Y), the description given above may be referred to. Furthermore, it is preferable that the second phosphoric acid ester-based polymer also has an Mw value as described above.

The method for producing a phosphoric acid ester-based polymer of invention (V) is a method for producing a phosphoric acid ester-based polymer, the method containing a mixing step by conditioning a mixed solution containing a monomer 1 represented by the formula (1), a monomer 2 represented by the formula (2), and a monomer 3 represented by the formula (3), and step of copolymerizing the monomer 1, monomer 2 and monomer 3, wherein the mixing involves a process of mixing the monomers 1, 2 and 3 at a temperature of 10 to 50° C., the copolymerizing involves a process of performing copolymerization at pH 7 or lower in a polymerization solvent having a dissolved oxygen concentration at 25° C. of 0.01 to 4.0 mg/kg in the presence of a phosphonic acid-based chelating agent, the copolymerizing step is initiated within 72 hours after the mixing, and the temperature of the mixed solution is maintained in the range of 10 to 50° C. until the time that the copolymerizing step is initiated.

Since the monomer raw material containing the monomer 3 is generally expected to be accompanied by significant gelation, it is usually conceived that the raw material is not suitable as the raw material of the production of a polymer for a dispersant for hydraulic compositions. However, when the essential conditions of invention (I), invention (II) and invention (III) are all employed, gelation caused by the monomer 3 is further suppressed, and a phosphoric acid ester-based polymer which is suitable as a dispersant for hydraulic compositions can be produced stably in an industrially practical level with good reproducibility, even in a large-scale production where the total of the monomer weight exceeds 10 tons.

As for the suitable conditions, the details of invention (I), invention (II) and invention (III) can be applied.

More preferred production conditions will be described from the viewpoints of suppression of gelation, adjustment to suitable molecular weight, and the design of performance of the dispersant for hydraulic compositions. From such point of view, in the present invention, it is preferable to use a chain transfer agent during the copolymerization in an amount of 4% by mole or more, more preferably 6% by mole or more, and even more preferably 8% by mole or more, based on the total number of moles of the monomers 1 to 3. The upper limit of the amount of use of the chain transfer agent can be set to preferably 100% by mole or less, more preferably 60% by mole or less, even more preferably 30% by mole or less, and even more preferably 15% by mole or less, based on the total number of moles of the monomers 1 to 3. Overall, the amount of use of the chain transfer agent is preferably 4 to 100% by mole, more preferably 6 to 60% by mole, and even more preferably 8 to 30% by mole.

Invention (V) provides a method of producing a phosphoric acid ester-based polymer with a mixed solution containing the monomer 1, monomer 2 and monomer 3, the mixed solution having been obtained by mixing the monomers 1 to 3 at a temperature of 10 to 50° C., and provides a phosphoric acid ester-based polymer by initiating the polymerization within 72 hours after the mixing of the monomers 1 to 3, performing the copolymerization at pH 7 or lower in a polymerization solvent having a dissolved oxygen concentration at 25° C. of 0.01 to 4.0 mg/kg, in the presence of a phosphonic acid-based chelating agent, and maintaining the temperature of the mixed solution in the range of 10 to 50° C. until the time when polymerization is initiated. Preferred structures of the monomers 1 to 3 are as described in the above.

Furthermore, invention (III) provides a method of producing a phosphoric acid ester-based copolymer with a mixed solution containing the components (X) and (Y) described above, the mixed solution having been obtained by mixing at a temperature of 10 to 50° C., and provides a phosphoric acid ester-based copolymer (second phosphoric acid ester-based polymer) by initiating the polymerization within 72 hours after mixing the components (X) and (Y), performing the copolymerization at pH 7 or lower in a polymerization solvent having a dissolved oxygen concentration at 25° C. of 0.01 to 4.0 mg/kg, in the presence of a phosphonic acid-based chelating agent, and maintaining the temperature of the mixed solution in the range of 10 to 50° C. until polymerization is initiated. For a preferred structure of the monomer 1 and a preferred structure of the phosphoric acid ester (Y), the description given above may be referred to. It is preferable that the second phosphoric acid ester-based polymer also has an Mw value as described above.

<Dispersant for Hydraulic Compositions>

The phosphoric acid ester-based polymer obtained by the production methods of the present invention can be used in all of the inorganic hydraulic powders exhibiting curability by a hydration reaction as dispersants for hydraulic compositions, including various cements. The dispersant for hydraulic compositions containing the polymer of the invention may be in the form of powder or liquid. In the case of a liquid form, a dispersant using water as the solvent or dispersion medium (aqueous solution, etc.) is preferred from the viewpoint of workability and the reduction of environmental load. In the dispersant of the invention, the content of the polymer of the invention is preferably 10 to 100% by weight, more preferably 15 to 100% by weight, and even more preferably 20 to 100% by weight, of the solids fraction. Furthermore, in the case of a liquid form, the solids concentration is preferably 5 to 40% by weight, more preferably 10 to 40% by weight, and even more preferably 20 to 35% by weight, from the viewpoint of the ease of production and workability. It is preferable in terms of the dispersing effect that the dispersant of the invention is used at a ratio of 0.02 to 1 part by weight, and more preferably 0.04 to 0.4 parts by weight, as the solids concentration of the polymer, based on 100 parts by weight of the hydraulic powder. For the phosphoric acid ester-based polymer of the invention, the storage temperature is preferably in the range of 15 to 50° C., from the viewpoint of suppressing the hydrolysis of ester bonds. If the storage temperature is higher than 50° C., it is preferable to set the storage period to be within 3 months.

As the cement, there may be mentioned ordinary Portland cement, high early strength Portland cement, ultrahigh early strength Portland cement, or Eco-cement (for example, JIS R5214, etc.). Hydraulic powders other than cement may include blast furnace slag, fly ash, silica fume and the like, and may also include non-hydraulic fine powders of limestone and the like. Silica fume cement mixed with cement, or blast furnace cement may also be used.

The dispersant for hydraulic compositions of the invention can also contain other additives (materials). For example, there may be mentioned AE agents such as resin soaps, saturated or unsaturated fatty acids, sodium hydroxystearate, lauryl sulfate, alkylbenzenesulfonic acid (salts), alkanesulfonate, polyoxyalkylene alkyl (phenyl)ether, polyoxyalkylene alkyl (phenyl)ether sulfuric acid esters (salts), polyoxyalkylene alkyl (phenyl)ether phosphoric acid esters (salts), protein materials, alkenylsuccinic acids and α-olefin sulfonates; retardants, such as oxycarboxylic acids such as gluconic acid, glucoheptonic acid, arabonic acid, malic acid and citric acid, sugars such as dextrin, monosaccharides, oligosaccharides and polysaccharides, and sugar alcohols; foaming agents; thickening agents; silica; AE water-reducing agents; early strength agents or promoting agents such as soluble calcium salts such as calcium chloride, calcium nitrite, calcium nitrate, calcium bromide and calcium iodide, chlorides such as iron chloride and magnesium chloride, sulfates, potassium hydroxide, sodium hydroxide, carbonates, thiosulfates, formic acid (salts) and alkanolamine; expanding agents; waterproofing agents such as resin acids (salts), fatty acid esters, oils and fats, silicones, paraffins, asphalt and waxes; blast furnace slag; fluidizing agents; defoaming agents such as dimethylpolysiloxanes, polyalkylene glycol fatty acid esters, mineral oils, oils and fats, oxyalkylenes, alcohols and amides; anti-foaming agents; fly ash; high performance water-reducing agents such as melamine-sulfonic acid-formalin condensates, aminosulfonic acids, and polycarboxylic acids including polymaleic acids; silica fume; antirusting agent such as nitrites, phosphates and zinc oxide; water-soluble polymers, such as celluloses such as methylcellulose and hydroxyethylcellulose, natural products such as β-1,3-glucane and xanthan gum, synthetic products such as polyacrylic acid amide, polyethylene glycol, ethylene oxide adduct of oleyl alcohol or a reaction product thereof with vinylcyclohexene diepoxide; or polymer emulsions of alkyl (meth)acrylate.

The dispersant for hydraulic compositions of the invention is useful in the fields of ready-mixed concrete and concrete vibration products as well as in any of the fields for various concretes for the applications such as for self-leveling, refractories, plaster, gypsum slurries, light or heavy concrete, AE, maintenance, prepacked, tremie, foundation improvement, grouting and cold weather.

<Hydraulic Composition>

The hydraulic composition which is an object of the dispersant of the invention may have a water/hydraulic powder ratio [percent by weight (% by weight) of water and hydraulic powder in a hydraulic composition, hereinafter, indicated as W/P] of 65% or less, more preferably 10 to 60%, even more preferably 12 to 57%, and in view of exhibiting a low viscosity effect, even more preferably 15 to 55%, and even more preferably 20 to 55%.

The hydraulic composition of the invention may be a paste, mortar, concrete or the like containing water and a hydraulic powder (cement), but may also contain aggregates. As the aggregates, fine aggregates or coarse aggregates may be mentioned. The fine aggregates are preferably pit sand, land sand, river sand or crushed sand, while the coarse aggregates are preferably pit gravel, land gravel, river gravel or crushed stone. According to the uses, light aggregates may also be used. In addition, the terms for aggregates have been referred to from "Concrete Reivew" (Jun. 10, 1998, published by GIJUTUSYOIN).

EXAMPLES

Figure 1:
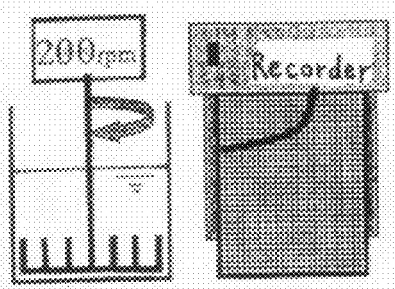
FIG. 1 is a schematic diagram of the torque tester and recorder used in the measurement of viscosity in Examples and Comparative Examples.

The following Examples will describe the implementation of the present invention. The Examples are to illustrate embodiments of the present invention, and are not intended to limit the invention.

The monomer composition in Table 1-1 and the following Synthesis Examples were combined as indicated in Table 1-3 to produce phosphoric acid ester-based polymers. With regard to each combination, polymerization was performed 3 times, and the fluctuation in the performance of the phosphoric acid ester polymer as a dispersant for hydraulic compositions was evaluated.

(1) Production Method (1-1) Synthesis Examples 1-A1 to 1-A4 Using Composition No. A Synthesis 1-A1

197 g of water was introduced into a glass reaction vessel (four-necked flask) equipped with a stirrer, and pressure reduction and nitrogen purging were repeated while stirring, to adjust the dissolved oxygen concentration of the water to 0.2 mg/kg with respect to 25° C. Subsequently, while introducing 3 ml/min of nitrogen per 1000 parts by weight of the total feed, the temperature was elevated to 80° C. in a nitrogen atmosphere. A solution prepared by dissolving 38 g of ω-methoxypolyethylene glycol monomethacrylate (number of added moles of ethylene oxide: 9; NK Ester-M90G manufactured by Shin-Nakamura Chemical Co., Ltd.), 41.6 g of a mixture of phosphoric acid mono(2-hydroxyethyl)methacrylic acid ester and di[(2-hydroxyethyl)methacrylic acid] ester (Phosmer-M; Unichemical Co., Ltd.), and 6.0 g of 3-mercaptopropionic acid in 38 g of water, and a solution prepared by dissolving 5.1 g of ammonium persulfate in 59 g of water were both added dropwise, over 1.5 hours for each. After aging for 1 hour, a solution prepared by dissolving 2.6 g of ammonium persulfate in 30 g of water was added dropwise over 30 minutes, and then the mixture was aged at the same temperature (80° C.) for 1.5 hours. After completion of the aging, the system was neutralized with 51.7 g of a 20% aqueous solution of sodium hydroxide, to obtain a phosphoric acid ester-based polymer (pH at the time of monomer polymerization was 1.2).

Synthesis Example 1-A2

A phosphoric acid ester-based polymer was obtained in the same manner as in Synthesis Example 1-A1, except that the dissolved oxygen concentration of the water was adjusted to 2.1 mg/kg (pH at the time of monomer polymerization was 1.2).

Synthesis Example 1-A3

A phosphoric acid ester-based polymer was obtained in the same manner as in Synthesis Example 1-A1, except that the dissolved oxygen concentration of the water was adjusted to 3.8 mg/kg (pH at the time of monomer polymerization was 1.2).

Synthesis Example 1-A4

A phosphoric acid ester-based polymer was obtained in the same manner as in Synthesis Example 1-A1, except that the dissolved oxygen concentration of the water was adjusted to 4.5 mg/kg (pH at the time of monomer polymerization was 1.2).

(1-2) Synthesis Examples 1-B1 to 1-B2 Using Composition No. B

Synthesis Example 1-B1

366 g of water was introduced into a glass reaction vessel (four-necked flask) equipped with a stirrer, and pressure reduction and nitrogen purging were repeated while stirring, to adjust the dissolved oxygen concentration of the water to 0.2 mg/kg with respect to 25° C. Subsequently, while introducing 3 ml/min of nitrogen per 1000 parts by weight of the total feed, the temperature was elevated to 80° C. in a nitrogen atmosphere. A mixture of 450 g (effective fraction 60.8%, water fraction 35%) of ω-methoxypolyethylene glycol monomethacrylate (number of added moles of ethylene oxide: 23), 71.6 g of a phosphoric acid esterification product (A), which was a mixture of phosphoric acid mono(2-hydroxyethyl)methacrylic acid ester and di[(2-hydroxyethyl) methacrylic acid]ester, and 4.5 g of 3-mercaptopropionic acid, and a solution prepared by dissolving 8.4 g of ammonium persulfate in 48 g of water were both added dropwise, over 1.5 hours for each. After aging for 1 hour, a solution prepared by dissolving 1.8 g of ammonium persulfate in 10 g of water was added dropwise over 30 minutes, and then the mixture was aged at the same temperature (80° C.) for 1.5 hours. After completion of the aging, the system was neutralized with 44.4 g of a 32% aqueous solution of sodium hydroxide, to obtain a phosphoric acid ester-based polymer (pH at the time of monomer polymerization was 1.0).

Preparation Example 1-1 (Production of Phosphoric Acid Esterification Product (A))

The phosphoric acid esterification product (A) used herein was obtained by introducing 200 g of 2-hydroxyethyl methacrylate and 36.0 of 85% phosphoric acid ($H_3PO_4$) into a reaction vessel, slowly adding 89.1 g of diphosphorus pentoxide (phosphoric anhydride) ($P_2O_5$) while cooling the system so that the temperature would not exceed 60° C., setting the reaction temperature to 80° C., allowing the system to react for 6 hours, and cooling the system.

Synthesis 1-B2

A phosphoric acid ester-based polymer was obtained in the same manner as in Synthesis Example 1-B1, except that the dissolved oxygen concentration of the water was adjusted to 4.5 mg/kg (pH at the time of monomer polymerization was 1.0).

(1-3) Synthesis Examples 1—C1 to 1-C2 Using Composition No. C

Synthesis Example 1-C1

218 g of water was introduced into a glass reaction vessel (four-necked flask) equipped with a stirrer, and pressure reduction and nitrogen purging were repeated while stirring, to adjust the dissolved oxygen concentration of the water to 0.2 mg/kg with respect to 25° C. Subsequently, while introducing 3 ml/min of nitrogen per 1000 parts by weight of the total feed, the temperature was elevated to 80° C. in a nitrogen atmosphere. A solution prepared by dissolving 55 g of w-methoxypolyethylene glycol monomethacrylate (number of added moles of ethylene oxide: 23; NK Ester-M230G manufactured by Shin-Nakamura Chemical Co., Ltd.), 32.3 g of a mixture of phosphoric acid mono(2-hydroxyethyl)methacrylic acid ester and di[(2-hydroxyethyl)methacrylic acid] ester (Phosmer-M; Unichemical Co., Ltd.), and 1.1 g of 3-mercaptopropionic acid in 55 g of water, and a solution prepared by dissolving 3.8 g of ammonium persulfate in 43 g of water were both added dropwise, over 1.5 hours for each. After aging for 1 hour, a solution prepared by dissolving 1.9 g of ammonium persulfate in 22 g of water was added dropwise over 30 minutes, and then the mixture was aged at the same temperature (80° C.) for 1.5 hours. After completion of the aging, the system was neutralized with 40.1 g of a 20% aqueous solution of sodium hydroxide, to obtain a phosphoric acid ester-based polymer (pH at the time of monomer polymerization was 1.3).

Synthesis Example 1-C2

A phosphoric acid ester-based polymer was obtained in the same manner as in Synthesis Example 1-C1, except that the dissolved oxygen concentration of the water was adjusted to 4.5 mg/kg (pH at the time of monomer polymerization was 1.3).

(2) Monomer Composition

The raw materials fed and feed ratios of the monomers 1 to 3 are presented in Table 1-1.

TABLE 1-1

| | Raw materials | | | | | | |
|---|---|---|---|---|---|---|---|
| | Monomer 1 | | | | Feed ratio (% by mole) | | |
| Composition No. | Structure | n in the formula (1) | Monomer 2 | Monomer 3 | Monomer 1 | Monomer 2 | Monomer 3 |
| A | MEPEG-E | 9 | HEMA-MPE | HEMA-DPE | 34 | 46 | 20 |
| B | MEPEG-E | 23 | HEMA-MPE | HEMA-DPE | 50 | 35 | 15 |
| C | MEPEG-E | 23 | HEMA-MPE | HEMA-DPE | 30 | 49 | 21 |

The abbreviations in the table are as follows.
MEPEG-E: ω-methoxypolyethylene glycol monomethacrylate
HEMA-MPE: phosphoric acid mono(2-hydroxyethyl)methacrylic acid ester
HEMA-DPE: phosphoric acid di[(2-hydroxyethyl)methacrylic acid] ester
Mw: weight average molecular weight of the phosphoric acid ester-based polymer (3) Evaluation Method Using the phosphoric acid ester-based polymer obtained by the production method described above, a test on the mortar of the mixture in Table 1-2 was performed. The results are presented in Table 1-3. The evaluation was performed on the dispersibility and viscosity by the following methods.

(3-1) Mortar Mixing

TABLE 1-2

| W/C | Unit amount (g/batch) | | |
|---|---|---|---|
| (%) | W | C | S |
| 40 | 160 | 400 | 700 |

The materials used in the Table 1-2 are the following.
C: ordinary cement (a mixture of ordinary Portland cement manufactured by Taiheiyo Cement Corp. and ordinary Portland cement manufactured by Sumitomo Osaka Cement Co., Ltd. at a weight ratio of 1:1)
W: ion exchanged water
S: pit sand produced from Kimitsu, Chiba-Prefecture (product passing 3.5 mm)
W/C: percent by weight (wt %) of water (W) and cement (C) (the same applies hereinafter).

(3-2) Preparation of Mortar

S was introduced in about ½ the amount of the mixture indicated in Table 2 into a vessel (1 L stainless beaker: internal diameter 120 mm), then C was introduced, and then the remaining S was introduced. As a stirrer, Z-2310 manufactured by EYELA (Tokyo Rikagaku Kikai Co., Ltd.; stirring rod: height 50 mm, internal diameter 5 mm×6 rods/length 110 mm) was used to empty knead at 200 rpm for 25 seconds, and then a mixed solution prepared in advance by mixing a dispersant and water was introduced over 5 seconds, which was used for 30 seconds after the introduction to scrape off any material present on the wall or between the stirring rods. Water was introduced, and for 3 minutes thereafter, kneading was performed for 200 rpm, to prepare a mortar. In addition, a defoaming agent was added if necessary, to adjust the amount of entrained air to be 2% or less.

(3-3) Evaluation (3-3-1) Dispersibility

Using a cone having an upper opening diameter of 70 mm, a lower opening diameter of 100 mm and a height of 60 mm, the dispersibility immediately after kneading was evaluated by means of the amount of addition (% by weight of the effective fraction based on cement, expressed in % in the table) of a phosphoric acid ester-based polymer required to achieve a mortar flow value of 200 mm. Additionally, this mortar flow value of 200 mm is an average value of the maximum mortar flow value and a mortar flow value measured in the perpendicular direction at a ½ length of the line segment giving the maximum value. A smaller amount of addition represents stronger dispersibility.

(3-3-2) Viscosity

Figure 2:
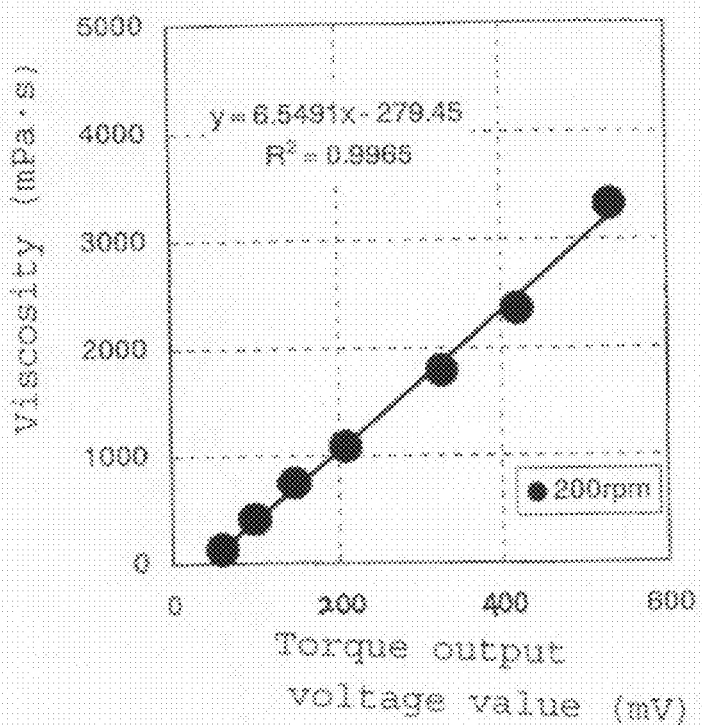
FIG. 2 shows the relationship of torque-viscosity of polyethylene glycol (Mw 20,000) used in the calculation of viscosity in Examples and Comparative Examples.

A recorder was connected to a torque tester shown in FIG. 1, and the torque of the mortar immediately after kneading was measured. From the relationship of torque-viscosity prepared in advance using polyethylene glycol (Mw 20,000) as shown in FIG. 2, the viscosity was calculated from the torque of the mortar. Upon preparing the torque-viscosity relationship of polyethylene glycol, the torque output voltage value (mV) is recorded by the recorder, at a monitor output of 60 W and an output signal of DC 0 to 5 V.

was small, and consequently, as for the resulting performance (necessary amount of addition, mortar viscosity), the same performance could be obtained with good reproducibility.

Example 2-1

366 g of ion-exchanged water was introduced into a glass reaction vessel (four-necked flask) equipped with a stirrer, nitrogen purging was performed while stirring, and the temperature was elevated to 80° C. in a nitrogen atmosphere. A mixture prepared by mixing 1.68 g of Dequest 2006 (effective fraction: 25%, phosphonic acid chelating agent, compound of the formula (a), Solutia, Inc.) with a mixture of 450 g (effective fraction 60.8%, water fraction 35%) of ω-methoxypolyethylene glycol monomethacrylate (average number of added moles of ethylene oxide: 23), 71.6 g of a phosphoric acid esterification product (A), which was a mixture of a phosphoric acid mono(2-hydroxyethyl)methacrylic acid ester and phosphoric acid di[(2-hydroxyethyl)methacrylic acid]ester, and 4.5 g of 3-mercaptopropionic acid (iron ion concentration: 2.4 mg/kg), and a solution prepared by dissolving 8.4 g of ammonium persulfate in 48 g of water, were both added dropwise, each over 1.5 hours. After 1 hour of aging, a solution prepared by dissolving 1.8 g of ammonium persulfate in 10 g of water was added dropwise over 30 minutes, and then the system was aged at the same temperature (80° C.) for 1.5 hours. After completion of the aging, the system was cooled to 65° C. and neutralized with 44.4 g of a 32% aqueous solution of sodium hydroxide, and the system was cooled to 60° C. while stirring. 0.57 g of 35% hydrogen peroxide was added, and then the system was mixed at 60° C. for about 30 minutes, to obtain a phosphoric acid ester-based copolymer. In addition, as for the iron ions, ferrous sulfate ($FeSO_4 \cdot 7H_2O$) was dissolved in the water in ω-methoxypolyethylene glycol monomethacrylate, and supplied (hereinafter, the same).

The phosphoric acid esterification product (A) is a product obtained in Preparation Example 1-1.

TABLE 1-3

| | Method | Composition No. | Dissolved oxygen concentration (mg/kg) | Number of polymerization performed | Mw | Amount of addition(%) | Mortar viscosity (mPa · s) |
|---|---|---|---|---|---|---|---|
| Example 1-1 | Synthesis example 1-A1 | A | 0.2 | first | 24,000 | 0.228 | 2800 |
| | | | | second | 24,000 | 0.227 | 2824 |
| | | | | third | 23,000 | 0.230 | 2784 |
| Example 1-2 | Synthesis example 1-A2 | A | 2.1 | first | 25,000 | 0.225 | 2864 |
| | | | | second | 24,000 | 0.228 | 2842 |
| | | | | third | 25,000 | 0.220 | 2922 |
| Example 1-3 | Synthesis example 1-A3 | A | 3.8 | first | 24,000 | 0.230 | 2864 |
| | | | | second | 27,000 | 0.215 | 2915 |
| | | | | third | 25,000 | 0.228 | 2955 |
| Comparative example 1-1 | Synthesis example 1-A4 | A | 4.5 | first | 31,000 | 0.204 | 3355 |
| | | | | second | 25,000 | 0.225 | 2955 |
| | | | | third | 24,000 | 0.228 | 3022 |
| Example 1-4 | Synthesis example 1-B1 | B | 0.2 | first | 34,000 | 0.110 | 2774 |
| | | | | second | 36,000 | 0.104 | 2785 |
| | | | | third | 33,000 | 0.112 | 2755 |
| Comparative example 1-2 | Synthesis example 1-B2 | B | 4.5 | first | 35,000 | 0.115 | 2842 |
| | | | | second | 44,000 | 0.108 | 3245 |
| | | | | third | 42,000 | 0.131 | 3187 |
| Example 1-5 | Synthesis example 1-C1 | C | 0.2 | first | 35,000 | 0.118 | 2359 |
| | | | | second | 38,000 | 0.120 | 2385 |
| | | | | third | 34,000 | 0.118 | 2362 |
| Comparative example 1-3 | Synthesis example 1-C2 | C | 4.5 | first | 34,000 | 0.122 | 2455 |
| | | | | second | 52,000 | 0.105 | 2845 |
| | | | | third | 48,000 | 0.142 | 2788 |

The polymerization reaction in the Table 1-3 was performed such that the first to the third reactions were performed not consecutively, but on different days, and different raw materials were used for each of the monomer lots. In Examples 1-1 to 1-5, the fluctuation in the molecular weight Example 2-2

A phosphoric acid ester-based copolymer was obtained in the same manner as in Example 2-1, except that the chelating agent was changed to 0.63 g of Dequest 2041 (effective fraction 25%, phosphonic acid-based chelating agent, compound of the formula (c), Solutia, Inc.).

Example 2-3

A phosphoric acid ester-based copolymer was obtained in the same manner as in Example 2-1, except that the chelating agent was changed to 0.63 g of Dequest 2066 (effective fraction 25%, phosphonic acid-based chelating agent, compound of the formula (d), Solutia, Inc.).

Example 2-4

366 g of ion-exchanged water and 0.63 g of Dequest 2066 (effective fraction 25%) were introduced into a glass reaction vessel (four-necked flask) equipped with a stirrer, nitrogen purging was performed while stirring, and the temperature was elevated to 80° C. in a nitrogen atmosphere. A mixture of 450 g (effective fraction 60.8%, water fraction 35%) of ω-methoxypolyethylene glycol monomethacrylate (average number of added moles of ethylene oxide: 23), 71.6 g of a phosphoric acid esterification product (A), which was a mixture of phosphoric acid mono(2-hydroxyethyl)methacrylic acid ester and phosphoric acid di[(2-hydroxyethyl)methacrylic acid]ester, and 4.5 g of 3-mercaptopropionic acid (iron ion concentration: 2.4 mg/kg), and a solution prepared by dissolving 8.4 g of ammonium persulfate in 48 g of water, were both added dropwise over 1.5 hours. After aging for 1 hour, a solution prepared by dissolving 1.8 g of ammonium persulfate in 10 g of water was added dropwise over 30 minutes, and then the system was aged at the same temperature (80° C.) for 1.5 hours. After completion of the aging, the system was cooled to 65° C. and neutralized with 44.4 g of a 32% aqueous solution of sodium hydroxide, and the system was cooled to 60° C. while stirring. 0.57 g of 35% hydrogen peroxide was added, and then the system was mixed at 60° C. for about 30 minutes, to obtain a phosphoric acid ester-based copolymer.

Example 2-5

A phosphoric acid ester-based copolymer was obtained in the same manner as in Example 3, except that the iron ion concentration in the polymerization reaction system (liquid mixture including monomers and the like; hereinafter, the same) as changed to 0.0 mg/kg.

Comparative Example 2-1

A phosphoric acid ester-based copolymer was obtained in the same manner as in Example 2-1, except that no chelating agent was added.

Comparative Example 2-2

A phosphoric acid ester-based copolymer was obtained in the same manner as in Example 2-1, except that the iron ion concentration in the polymerization reaction system was changed to 0.6 mg/kg.

Comparative Example 2-3

A phosphoric acid ester-based copolymer was obtained in the same manner as in Example 2-1, except that the chelating agent was changed to EDTA (ethylenediaminetetraacetic acid: manufactured by Wako Pure Chemical Industries, Ltd.) (effective fraction 25%).

Example 2-6

371 g of ion-exchanged water was introduced into a glass reaction vessel (four-necked flask) equipped with a stirrer, nitrogen purging was performed while stirring, and the temperature was elevated to 80° C. in a nitrogen atmosphere. A mixture prepared by mixing 0.64 g of Dequest 2066 (25%) with a mixture of 500 g (effective fraction 60.8%, water fraction 35%) of ω-methoxypolyethylene glycol monomethacrylate (average number of added moles of ethylene oxide: 23), 34.1 g of a phosphoric acid esterification product (A), which was a mixture of a phosphoric acid mono (2-hydroxyethyl)methacrylic acid ester and phosphoric acid di[(2-hydroxyethyl)methacrylic acid]ester, and 2.8 g of 3-mercaptopropionic acid (iron ion concentration: 2.4 mg/kg), and a solution prepared by dissolving 7.2 g of ammonium persulfate in 41 g of water, were both added dropwise, each over 1.5 hours. After aging for 1 hour, a solution prepared by dissolving 1.6 g of ammonium persulfate in 9 g of water was added dropwise over 30 minutes, and then the system was aged at the same temperature (80° C.) for 1.5 hours. After completion of the aging, the system was cooled to 65° C. and neutralized with 21.2 g of a 32% aqueous solution of sodium hydroxide, and the system was cooled to 60° C. while stirring. 0.56 g of 35% hydrogen peroxide was added, and then the system was mixed at 60° C. for about 30 minutes, to obtain a phosphoric acid ester-based copolymer.

Example 2-7

381 g of ion-exchanged water was introduced into a glass reaction vessel (four-necked flask) equipped with a stirrer, nitrogen purging was performed while stirring, and the temperature was elevated to 80° C. in a nitrogen atmosphere. A mixture prepared by mixing 0.66 g of Dequest 2066 (25%) with a mixture of 520 g (effective fraction 60.8%, water fraction 35%) of ω-methoxypolyethylene glycol monomethacrylate (average number of added moles of ethylene oxide: 23), 28.6 g of a phosphoric acid esterification product (A), which was a mixture of a phosphoric acid mono (2-hydroxyethyl)methacrylic acid ester and phosphoric acid di[(2-hydroxyethyl)methacrylic acid]ester, and 2.8 g of 3-mercaptopropionic acid (iron ion concentration: 2.4 mg/kg), and a solution prepared by 7.2 g of ammonium persulfate in 41 g of water, were both added dropwise, each over 1.5 hours. After aging for 1 hour, a solution prepared by dissolving 1.6 g of ammonium persulfate in 9 g of water was added dropwise over 30 minutes, and then the system was aged at the same temperature (80° C.) for 1.5 hours. After completion of the aging, the system was cooled to 65° C. and neutralized with 17.7 g of a 32% aqueous solution of sodium hydroxide, and the system was cooled to 60° C. while stirring. 0.58 g of 35% hydrogen peroxide was added, and then the system was mixed at 60° C. for about 30 minutes, to obtain a phosphoric acid ester-based copolymer.

Example 2-8

471 g of ion-exchanged water was introduced into a glass reaction vessel (four-necked flask) equipped with a stirrer, nitrogen purging was performed while stirring, and the temperature was elevated to 80° C. in a nitrogen atmosphere. A mixture prepared by mixing 0.16 g of Dequest 2066 (25%) with a mixture of 290 g (effective fraction 84.4%, water fraction 10%) of ω-methoxypolyethylene glycol monomethacrylate (average number of added moles of ethylene oxide: 9), 93.8 g of a phosphoric acid esterification product (A), which was a mixture of a phosphoric acid mono (2-hydroxyethyl)methacrylic acid ester and phosphoric acid di[(2-hydroxyethyl)methacrylic acid]ester, and 11.3 g of 3-mercaptopropionic acid (iron ion concentration: 2.4 mg/kg), and a solution prepared by dissolving 8.2 g of ammonium persulfate in 46 g of water, were both added dropwise, each over 1.5 hours. After aging for 1 hour, a solution prepared by dissolving 3.3 g of ammonium persulfate in 19 g of water was added dropwise over 30 minutes, and then the system was aged at the same temperature (80° C.) for 1.5 hours. After completion of the aging, the system was cooled to 65° C. and neutralized with 58.2 g of a 32% aqueous solution of sodium hydroxide, and the system was cooled to 60° C. while stirring. 0.57 g of 35% hydrogen peroxide was added, and then the system was mixed at 60° C. for about 30 minutes, to obtain a phosphoric acid ester-based copolymer.

Example 2-9

489 g of ion-exchanged water was introduced into a glass reaction vessel (four-necked flask) equipped with a stirrer, nitrogen purging was performed while stirring, and the temperature was elevated to 80° C. in a nitrogen atmosphere. A mixture prepared by mixing 0.07 g of Dequest 2066 (25%) with a mixture of 290 g (effective fraction 84.4%, water fraction 10%) of ω-methoxypolyethylene glycol monomethacrylate (average number of added moles of ethylene oxide: 9), 53.2 g of a phosphoric acid esterification product (A), which was a mixture of a phosphoric acid mono (2-hydroxyethyl)methacrylic acid ester and phosphoric acid di[(2-hydroxyethyl)methacrylic acid]ester, and 9.1 g of 3-mercaptopropionic acid (iron ion concentration: 0.6 mg/kg), and a solution prepared by dissolving 7.8 g of ammonium persulfate in 44 g of water, were both added dropwise, each over 1.5 hours. After aging for 1 hour, a solution prepared by dissolving 3.1 g of ammonium persulfate in 18 g of water was added dropwise over 30 minutes, and then the system was aged at the same temperature (80° C.) for 1.5 hours. After completion of the aging, the system was cooled to 65° C. and neutralized with 33.0 g of a 32% aqueous solution of sodium hydroxide, and the system was cooled to 60° C. while stirring. 0.54 g of 35% hydrogen peroxide was added, and then the system was mixed at 60° C. for about 30 minutes, to obtain a phosphoric acid ester-based copolymer.

Test Example

The feeding raw materials of the phosphoric acid ester-based copolymers obtained in Examples 2-1 to 2-9 and Comparative Examples 2-1 to 2-3 were as indicated in Table 2-1. The feed numbers (Feed No.) correspond to the feed in the Examples and Comparative Examples indicated in Table 2-3. For each of the Examples and Comparative Examples, polymerization was performed three times respectively, and the fluctuation in the weight average molecular weight (Mw) of the phosphoric acid ester-based copolymers was evaluated. Furthermore, for some of the copolymers, the fluctuation in the performance as a dispersant for hydraulic compositions was evaluated by the following method. Those results are presented in Table 2-3 and Table 2-4.

<Performance Evaluation>

(1) Preparation of mortar was performed similarly to the conditioning (3-2) described above.

(2) Evaluation (2-1) Fluidity

The evaluation of fluidity was performed in the same manner as for the dispersibility in the section (3-3-1). A smaller amount of addition represents stronger dispersibility.

(2-2) The viscosity was evaluated in the same manner as in the section (3-3-2), provided that the torque at a mortar flow of 200 mm was measured.

TABLE 2-1

| | Raw materials | | | | | | |
|---|---|---|---|---|---|---|---|
| | Monomer 1 | | | | Monomer-feed ratio | | |
| | | n in the | | | (% by mole) | | |
| Feed No. | Structure | formula (1) | Monomer 2 | Monomer 3 | Monomer 1 | Monomer 2 | Monomer 3 |
| 2-A-1 | MEPEG-E | 23 | HEMA-MPE | HEMA-DPE | 50 | 35 | 15 |
| 2-A-2 | MEPEG-E | 23 | HEMA-MPE | HEMA-DPE | 70 | 21 | 9 |
| 2-A-3 | MEPEG-E | 23 | HEMA-MPE | HEMA-DPE | 75 | 18 | 7 |
| 2-A-4 | MEPEG-E | 9 | HEMA-MPE | HEMA-DPE | 60 | 28 | 12 |
| 2-A-5 | MEPEG-E | 9 | HEMA-MPE | HEMA-DPE | 75 | 18 | 7 |

(Remark)
The abbreviations MEPEG-E, HEMA-MPE and HEMA-DPE in the table are the same as those given in Table 1-1.

TABLE 2-2

| | Unit amount(g/batch) | | |
|---|---|---|---|
| W/C (%) | W | C | S |
| 40 | 160 | 400 | 700 |

(Remark)
The materials used in Table 2-2 are the same as those used in Table 1-2.

TABLE 2-3

| | | Feed No. | Chelating agent Kind | Amount of addition*1 (mg/kg) | Iron ion concentration *2 (mg/kg) | Number of polymerization performed | Mw |
|---|---|---|---|---|---|---|---|
| Example | 2-1 | 2-A-1 | Dequest 2006 | 800 | 2.4 | first | 38,000 |
| | | | | | | second | 37,000 |
| | | | | | | third | 36,000 |
| | 2-2 | 2-A-1 | Dequest 2006 | 300 | 2.4 | first | 36,000 |
| | | | | | | second | 36,000 |
| | | | | | | third | 35,000 |
| | 2-3 | 2-A-1 | Dequest 2006 | 300 | 2.4 | first | 37,000 |
| | | | | | | second | 36,000 |
| | | | | | | third | 36,000 |
| | 2-4 | 2-A-1 | Dequest 2006 | 300*3 | 2.4 | first | 37,000 |
| | | | | | | second | 36,000 |
| | | | | | | third | 36,000 |
| | 2-5 | 2-A-1 | Dequest 2006 | 300 | 0.0 | first | 38,000 |
| | | | | | | second | 37,000 |
| | | | | | | third | 36,000 |
| Comparative example | 2-1 | 2-A-1 | None | 0 | 2.4 | first | gelation |
| | | | | | | second | gelation |
| | | | | | | third | gelation |
| | 2-2 | 2-A-1 | None | 0 | 0.6 | first | 135,000 |
| | | | | | | second | 126,000 |
| | | | | | | third | 101,000 |
| | 2-3 | 2-A-1 | EDTA | 800 | 2.4 | first | 129,000 |
| | | | | | | second | 114,000 |
| | | | | | | third | 108,000 |
| Example | 2-6 | 2-A-2 | Dequest 2006 | 300 | 2.4 | first | 35,000 |
| | | | | | | second | 35,000 |
| | | | | | | third | 34,000 |
| | 2-7 | 2-A-3 | Dequest 2006 | 300 | 2.4 | first | 35,000 |
| | | | | | | second | 34,000 |
| | | | | | | third | 33,000 |
| | 2-8 | 2-A-4 | Dequest 2006 | 100 | 2.4 | first | 21,000 |
| | | | | | | second | 21,000 |
| | | | | | | third | 21,000 |
| | 2-9 | 2-A-5 | Dequest 2006 | 50 | 0.6 | first | 22,000 |
| | | | | | | second | 21,000 |
| | | | | | | third | 21,000 |

(Remark)
*1 The amount of addition of a chelating agent is the amount of addition based on the polymerization reaction system (liquid mixture including monomers and the like).
*2: The iron ion concentration is the concentration in the polymerization reaction system (liquid mixture including monomers and the like).
*3 In Example 2-4, the chelating agent was added to the feed water.

TABLE 2-4

| | Number of polymerization performed | Mw | Amount of addition (% by weight) | Converted viscosity (mPa·s) |
|---|---|---|---|---|
| Example 2-1 | first | 38,000 | 0.108 | 2780 |
| | second | 37,000 | 0.105 | 2774 |
| | third | 36,000 | 0.106 | 2750 |
| Example 2-2 | first | 36,000 | 0.105 | 2774 |
| | second | 36,000 | 0.104 | 2774 |
| | third | 35,000 | 0.107 | 2750 |
| Example 2-3 | first | 37,000 | 0.106 | 2750 |
| | second | 36,000 | 0.108 | 2746 |
| | third | 36,000 | 0.105 | 2774 |
| Example 2-4 | first | 37,000 | 0.104 | 2774 |
| | second | 36,000 | 0.105 | 2774 |
| | third | 36,000 | 0.105 | 2750 |
| Example 2-5 | first | 38,000 | 0.103 | 2780 |
| | second | 37,000 | 0.104 | 2774 |
| | third | 36,000 | 0.105 | 2750 |
| Comparative example 2-1 | first | Gelation | — | — |
| | second | Gelation | — | — |
| | third | Gelation | — | — |
| Comparative example 2-2 | first | 135,000 | 0.262 | 3469 |
| | second | 126,000 | 0.215 | 3358 |
| | third | 101,000 | 0.181 | 3310 |
| Comparative example 2-3 | first | 129,000 | 0.228 | 3420 |
| | second | 114,000 | 0.214 | 3415 |
| | third | 108,000 | 0.185 | 3288 |

The first through the third of the number of polymerization in the Table 2-3 and Table 2-4 are the same. In all cases, the polymerization reaction was performed such that the first to the third reactions were performed not consecutively, but on different days, and different raw materials were used for each of the monomer lots. In Examples 2-1 to 2-9, the fluctuation in the molecular weight was small even though water containing iron ions was used, and consequently, as for the resulting dispersing effect (necessary amount of addition) and viscosity reducing effect (mortar viscosity), the same performance could be obtained with good reproducibility.

Example 3-1

366 g of ion-exchanged water was introduced into a glass reaction vessel (four-necked flask) equipped with a stirrer, nitrogen purging was performed while stirring, and the temperature was elevated to 80° C. in a nitrogen atmosphere. A mixture prepared by mixing 450 g of an aqueous monomer solution, which was obtained by adding an appropriate amount of water to ω-methoxypolyethylene glycol monomethacrylate (average number of added moles of ethylene oxide: 23) to obtain an effective fraction of 60.8% and a water fraction of 35%, dissolving the substance at 70° C., and then cooling to 30° C., 71.6 g of a phosphoric acid esterification product (A), which was a mixture of a phosphoric acid mono(2-hydroxyethyl)methacrylic acid ester and phosphoric acid di[(2-hydroxyethyl)methacrylic acid]ester, and 4.5 g of 3-mercaptopropionic acid (temperature of the respective components was all 30° C.) (preparation of mixed solution), and then leaving the mixed solution to stand for 1 hour at 25° C., and a solution prepared by dissolving 8.4 g of ammonium persulfate in 48 g of water, were both added dropwise, each over 1.5 hours. At that time, the mixed solution was maintained at a temperature of 25° C. until the solution was introduced to the reaction system. After aging for 1 hour, a solution prepared by dissolving 1.8 g of ammonium persulfate in 10 g of water was added dropwise over 30 minutes, and then the system was aged at the same temperature (80° C.) for 1.5 hours. After completion of the aging, the system was neutralized with 44.4 g of a 32% aqueous solution of sodium hydroxide, to obtain a phosphoric acid ester-based polymer. The content of unreacted monomer 2 and unreacted monomer 3 in the reaction product was 0.3% by mole based on the total of the feed amount of the monomer 2 and monomer 3.

The phosphoric acid esterification product (A) used in the above and following Examples and Comparative Examples were products obtained in the Preparation Example 1-1.

Comparative Example 3-1

To a glass reaction vessel (four-necked flask) equipped with a stirrer, 366 g of water, a mixture prepared by mixing 450 g of an aqueous monomer solution, which was obtained by adding an appropriate amount of water to ω-methoxypolyethylene glycol monomethacrylate (average number of added moles of ethylene oxide: 23) to obtain an effective fraction of 60.8% and a water fraction of 35%, dissolving the substance at 70° C., and then cooling to 30° C., 71.6 g of a phosphoric acid esterification product (A), which was a mixture of a phosphoric acid mono(2-hydroxyethyl)methacrylic acid ester and phosphoric acid di [(2-hydroxyethyl)methacrylic acid]ester, and 4.5 g of 3-mercaptopropionic acid were mixed (temperature of the respective components was all 30° C.) (preparation of mixed solution). The mixture was left to stand for 1 hour at 25° C. after the preparation, subsequently nitrogen purging was performed while stirring, and the temperature was elevated to 80° C. in a nitrogen atmosphere over 1 hour. After 30 minutes after reaching 80° C., dropwise addition of an aqueous solution prepared by dissolving 8.4 g of ammonium persulfate in 48 g of water, was initiated, and the solution was added dropwise over 1.5 hours. After aging for 1 hour, a solution prepared by dissolving 1.8 g of ammonium persulfate in 10 g of water was added dropwise over 30 minutes, and then the system was aged at the same temperature (80° C.) for 1.5 hours. After completion of the aging, the system was neutralized with 44.4 g of a 32% aqueous solution of sodium hydroxide, to obtain a phosphoric acid ester-based polymer. The content of unreacted monomer 2 and unreacted monomer 3 in the reaction product was 0.4% by mole based on the total of the feed amount of the monomer 2 and monomer 3.

Comparative Example 3-2

366 g of ion-exchanged water was introduced into a glass reaction vessel (four-necked flask) equipped with a stirrer, nitrogen purging was performed while stirring, and the temperature was elevated to 80° C. in a nitrogen atmosphere. 450 g of an aqueous monomer solution prepared by adding an appropriate amount of water to ω-methoxypolyethylene glycol monomethacrylate (average number of added moles of ethylene oxide: 23) to obtain an effective fraction of 60.8% and a water fraction of 35%, and dissolving the substance at 70° C., was not cooled, and to this, 71.6 g of a phosphoric acid esterification product (A), which was a mixture of a phosphoric acid mono(2-hydroxyethyl)methacrylic acid ester and phosphoric acid di [(2-hydroxyethyl)methacrylic acid]ester (temperature at 30° C.), and 4.5 g of 3-mercaptopropionic acid were added for 5 minutes and mixed (preparation of mixed solution). After the preparation, the mixture was cooled to 25° C. over 1 hour, and was left to stand for 1 hour (mixed solution). This and a solution prepared by dissolving 8.4 g of ammonium persulfate in 48 g of water, were added dropwise, each over 1.5 hours. At that time, the temperature of the mixed solution was maintained at 25° C. until the mixed solution was introduced into the reaction system. After aging for 1 hour, a solution prepared by dissolving 1.8 g of ammonium persulfate in 10 g of water was added dropwise over 30 minutes, and then the mixture was aged at the same temperature (80° C.) for 1.5 hours. After completion of the aging, the system was neutralized with 44.4 g of a 32% aqueous solution of sodium hydroxide, to obtain a phosphoric acid ester-based polymer. The content of unreacted monomer 2 and unreacted monomer 3 in the reaction product was 0.3% by mole based on the total of the feed amount of the monomer 2 and monomer 3.

Comparative Example 3-3

366 g of water was introduced into a glass reaction vessel (four-necked flask) equipped with a stirrer, nitrogen purging was performed while stirring, and the temperature was elevated to 80° C. in a nitrogen atmosphere. 450 g of an aqueous monomer solution prepared by adding an appropriate amount of water to ω-methoxypolyethylene glycol monomethacrylate (average number of added moles of ethylene oxide: 23) to obtain an effective fraction of 60.8% and a water fraction of 35%, and dissolving the substance at 70° C., was cooled to 30° C., and this was mixed with 71.6 g of a phosphoric acid esterification product (A), which was a mixture of a phosphoric acid mono(2-hydroxyethyl)methacrylic acid ester and phosphoric acid di [(2-hydroxyethyl)methacrylic acid]ester, and 4.5 g of 3-mercaptopropionic acid (temperature of the respective components was all 30° C.) (preparation of mixed solution). After the preparation, the mixture was left to stand for 96 hours at 25° C. This and a solution prepared by dissolving 8.4 g of ammonium persulfate in 48 g of water, were added dropwise, each over 1.5 hours. At that time, the temperature of the mixed solution was maintained at 25° C. until the mixture was introduced to the reaction system. After aging for 1 hour, a solution prepared by dissolving 1.8 g of ammonium persulfate in 10 g of water was added dropwise over 30 minutes, and then aged at the same temperature (80° C.) for 1.5 hours. After completion of the aging, the system was neutralized with 44.4 g of a 32% aqueous solution of sodium hydroxide, to obtain a phosphoric acid ester-based polymer. The content of unreacted monomer 2 and unreacted monomer 3 in the reaction product was 0.3% by mole based on the total of the feed amount of the monomer 2 and monomer 3.

Example 3-2

366 g of water was introduced into a glass reaction vessel (four-necked flask) equipped with a stirrer, nitrogen purging was performed while stirring, and the temperature was elevated to 80° C. in a nitrogen atmosphere. 450 g of an aqueous monomer solution prepared by adding an appropriate amount of water to w-methoxypolyethylene glycol monomethacrylate (average number of added moles of ethylene oxide: 23) to obtain an effective fraction of 60.8% and a water fraction of 35%, and dissolving the substance at 70° C., was cooled to 30° C., and this was mixed with 71.6 g of a phosphoric acid esterification product (A), which was a mixture of a phosphoric acid mono(2-hydroxyethyl)methacrylic acid ester and phosphoric acid di [(2-hydroxyethyl)methacrylic acid]ester, and 4.5 g of 3-mercaptopropionic acid (temperature of the respective components was all 30° C.) (preparation of mixed solution). After the preparation, the mixture was left to stand for 20 hours at 25° C. This and a solution prepared by dissolving 8.4 g of ammonium persulfate in 48 g of water were added dropwise, each for 1.5 hours. At that time, the temperature of the mixed solution was maintained at 25° C. until the mixture was introduced to the reaction system. After aging for 1 hour, a solution prepared by dissolving 1.8 g of ammonium persulfate in 10 g of water was added dropwise over 30 minutes, and then aged at the same temperature (80° C.) for 1.5 hours. After completion of the aging, the system was neutralized with 44.4 g of a 32% aqueous solution of sodium hydroxide, to obtain a phosphoric acid ester-based polymer. The content of unreacted monomer 2 and unreacted monomer 3 in the reaction product was 0.4% by mole based on the total of the feed amount of the monomer 2 and monomer 3.

Example 3-3

371 g of water was introduced into a glass reaction vessel (four-necked flask) equipped with a stirrer, nitrogen purging was performed while stirring, and the temperature was elevated to 80° C. in a nitrogen atmosphere. 500 g of an aqueous monomer solution prepared by adding an appropriate amount of water to ω-methoxypolyethylene glycol monomethacrylate (average number of added moles of ethylene oxide: 23) to obtain an effective fraction of 60.8% and a water fraction of 35%, and dissolving the substance at 70° C., was cooled to 30° C., and this was mixed with 34.1 g of a phosphoric acid esterification product (A), which was a mixture of a phosphoric acid mono(2-hydroxyethyl)methacrylic acid ester and phosphoric acid di [(2-hydroxyethyl)methacrylic acid]ester, and 2.8 g of 3-mercaptopropionic acid (temperature of the respective components was all 40° C.) (preparation of mixed solution). After the preparation, the mixture was left to stand for 2 hours at 25° C. This and a solution prepared by dissolving 7.2 g of ammonium persulfate in 41 g of water were added dropwise, each for 1.5 hours. At that time, the temperature of the mixed solution was maintained at 25° C. until the mixture was introduced to the reaction system. After aging for 1 hour, a solution prepared by dissolving 1.6 g of ammonium persulfate in 9 g of water was added dropwise over 30 minutes, and then aged at the same temperature (80° C.) for 1.5 hours. After completion of the aging, the system was neutralized with 21.2 g of a 32% aqueous solution of sodium hydroxide, to obtain a phosphoric acid ester-based polymer. The content of unreacted monomer 2 and unreacted monomer 3 in the reaction product was 0.3% by mole based on the total of the feed amount of the monomer 2 and monomer 3.

Example 3-4

381 g of water was introduced into a glass reaction vessel (four-necked flask) equipped with a stirrer, nitrogen purging was performed while stirring, and the temperature was elevated to 80° C. in a nitrogen atmosphere. 520 g of an aqueous monomer solution prepared by adding an appropriate amount of water to ω-methoxypolyethylene glycol monomethacrylate (average number of added moles of ethylene oxide: 23) to obtain an effective fraction of 60.8% and a water fraction of 35%, and dissolving the substance at 70° C., was cooled to 30° C., and this was mixed with 28.6 g of a phosphoric acid esterification product (A), which was a mixture of a phosphoric acid mono(2-hydroxyethyl)methacrylic acid ester and phosphoric acid di [(2-hydroxyethyl)methacrylic acid]ester, and 2.8 g of 3-mercaptopropionic acid (temperature of the respective components was all 45° C.) (preparation of mixed solution). After the preparation, the mixture was left to stand for 8 hours at 25° C. This and a solution prepared by dissolving 7.2 g of ammonium persulfate in 41 g of water were added dropwise, each for 1.5 hours. At that time, the temperature of the mixed solution was maintained at 25° C. until the mixture was introduced to the reaction system. After aging for 1 hour, a solution prepared by dissolving 1.6 g of ammonium persulfate in 9 g of water was added dropwise over 30 minutes, and then aged at the same temperature (80° C.) for 1.5 hours. After completion of the aging, the system was neutralized with 17.7 g of a 32% aqueous solution of sodium hydroxide, to obtain a phosphoric acid ester-based polymer. The content of unreacted monomer 2 and unreacted monomer 3 in the reaction product was 0.3% by mole based on the total of the feed amount of the monomer 2 and monomer 3.

Example 3-5

471 g of water was introduced into a glass reaction vessel (four-necked flask) equipped with a stirrer, nitrogen purging was performed while stirring, and the temperature was elevated to 80° C. in a nitrogen atmosphere. 290 g of an aqueous monomer solution prepared by adding an appropriate amount of water to ω-methoxypolyethylene glycol monomethacrylate (average number of added moles of ethylene oxide: 9) to obtain an effective fraction of 84.4% and a water fraction of 10%, and dissolving the substance at 70° C., was cooled to 30° C., and this was mixed with 93.8 g of a phosphoric acid esterification product (A), which was a mixture of a phosphoric acid mono(2-hydroxyethyl)methacrylic acid ester and phosphoric acid di[(2-hydroxyethyl)methacrylic acid]ester, and 11.3 g of 3-mercaptopropionic acid (temperature of the respective components was all 30° C.) (preparation of mixed solution). After the preparation, the mixture was left to stand for 24 hours at 25° C. This and a solution prepared by dissolving 8.2 g of ammonium persulfate in 46 g of water were added dropwise, each for 1.5 hours. At that time, the temperature of the mixed solution was maintained at 25° C. until the mixture was introduced to the reaction system. After aging for 1 hour, a solution prepared by dissolving 3.3 g of ammonium persulfate in 19 g of water was added dropwise over 30 minutes, and then aged at the same temperature (80° C.) for 1.5 hours. After completion of the aging, the system was neutralized with 58.2 g of a 32% aqueous solution of sodium hydroxide, to obtain a phosphoric acid ester-based polymer. The content of unreacted monomer 2 and unreacted monomer 3 in the reaction product was 0.8% by mole based on the total of the feed amount of the monomer 2 and monomer 3.

Example 3-6

489 g of water was introduced into a glass reaction vessel (four-necked flask) equipped with a stirrer, nitrogen purging was performed while stirring, and the temperature was elevated to 80° C. in a nitrogen atmosphere. 290 g of an aqueous monomer solution prepared by adding an appropriate amount of water to ω-methoxypolyethylene glycol monomethacrylate (average number of added moles of ethylene oxide: 9) to obtain an effective fraction of 84.4% and a water fraction of 10%, and dissolving the substance at 70° C., was cooled to 30° C., and this was mixed with 53.2 g of a phosphoric acid esterification product (A), which was a mixture of a phosphoric acid mono(2-hydroxyethyl)methacrylic acid ester and phosphoric acid [di C (2-hydroxyethyl)methacrylic acid]ester, and 9.1 g of 3-mercaptopropionic acid (temperature of the respective components was all 30° C.) (preparation of mixed solution). After the preparation, the mixture was left to stand for 36 hours at 25° C. This and a solution prepared by dissolving 7.8 g of ammonium persulfate in 44 g of water were added dropwise, each for 1.5 hours. At that time, the temperature of the mixed solution was maintained at 25° C. until the mixture was introduced to the reaction system. After aging for 1 hour, a solution prepared by dissolving 3.1 g of ammonium persulfate in 18 g of water was added dropwise over 30 minutes, and then aged at the same temperature (80° C.) for 1.5 hours. After completion of the aging, the system was neutralized with 33.0 g of a 32% aqueous solution of sodium hydroxide, to obtain a phosphoric acid ester-based polymer. The content of unreacted monomer 2 and unreacted monomer 3 in the reaction product was 1.6% by mole based on the total of the feed amount of the monomer 2 and monomer 3.

Examples 3-1 to 3-6 and Comparative Examples 3-1 to 3-3 were performed according to the Feed No. in the following Table 3-2. Feed Nos. 3-A-1 to 3-A-5 are presented in Table 3-1. Furthermore, the weight average molecular weight (Mw) of the phosphoric acid ester-based polymer in the case where the Examples and Comparative Examples were respectively performed multiple times, are summarized in Table 3-2.

TABLE 3-1

| | Feed raw materials | | | | | | |
|---|---|---|---|---|---|---|---|
| | Monomer 1 | | | | Monomer-feed ratio | | |
| | | n in the | | | (% by mole) | | |
| Feed No. | Structure | formula (1) | Monomer 2 | Monomer 3 | Monomer 1 | Monomer 2 | Monomer 3 |
| 3-A-1 | MEPEG-E | 23 | HEMA-MPE | HEMA-DPE | 50 | 35 | 15 |
| 3-A-2 | MEPEG-E | 23 | HEMA-MPE | HEMA-DPE | 70 | 21 | 9 |
| 3-A-3 | MEPEG-E | 23 | HEMA-MPE | HEMA-DPE | 75 | 18 | 7 |
| 3-A-4 | MEPEG-E | 9 | HEMA-MPE | HEMA-DPE | 60 | 28 | 12 |
| 3-A-5 | MEPEG-E | 9 | HEMA-MPE | HEMA-DPE | 75 | 18 | 7 |

The abbreviations MEPEG-E, HEMA-MPE and HEMA-DPE in the table are the same as those given in Table 1-1.

TABLE 3-2

| | Feed No. | Polymerization method | Mixed solution | | | Time taken from preparation to initiation of polymerization (hours) | Temperature maintained until initiation of polymerization | Number of polymerization performed | Mw |
|---|---|---|---|---|---|---|---|---|---|
| | | | Preparation temperature | pH (25° C.) | Appearance | | | | |
| Comparative example 3-1 | 3-A-1 | Initiator solution added dropwise | 30° C. | (0.1) | (uniform, transparent) | (2.5) | 80 | first second third | 58,000 52,000 49,000 |
| Comparative example 3-2 | 3-A-1 | Mixed solution added dropwise | 70° C. | 1.0 | uniform, transparent | 1 | 25 | first second third | 30,000 27,000 25,000 |
| Comparative example 3-3 | 3-A-1 | Mixed solution added dropwise | 30° C. | 1.0 | uniform, transparent | 96 | 25 | first second third | 34,000 31,000 30,000 |
| Example 3-1 | 3-A-1 | Mixed solution added dropwise | 30° C. | 1.0 | uniform, transparent | 1 | 25 | first second third | 37,000 36,000 36,000 |

TABLE 3-2-continued

| | Feed No. | Polymerization method | Preparation temperature | pH (25° C.) | Appearance | Time taken from preparation to initiation of polymerization (hours) | Temperature maintained until initiation of polymerization | Number of polymerization performed | Mw |
|---|---|---|---|---|---|---|---|---|---|
| Example 3-2 | 3-A-1 | Mixed solution added dropwise | 30° C. | 1.0 | uniform, transparent | 20 | 25 | first second third | 36,000 36,000 35,000 |
| Example 3-3 | 3-A-2 | Mixed solution added dropwise | 40° C. | 1.1 | uniform, transparent | 2 | 25 | first second third | 35,000 35,000 34,000 |
| Example 3-4 | 3-A-3 | Mixed solution added dropwise | 45° C. | 1.1 | uniform, transparent | 8 | 25 | first second third | 35,000 34,000 33,000 |
| Example 3-5 | 3-A-4 | Mixed solution added dropwise | 30° C. | 1.0 | uniform, transparent | 24 | 25 | first second third | 22,000 22,000 21,000 |
| Example 3-6 | 3-A-5 | Mixed solution added dropwise | 30° C. | 1.1 | uniform, transparent | 36 | 25 | first second third | 23,000 23,000 23,000 | the parentheses mean appearacne of the reaction mixture

The description within the parentheses is related to the reaction system.

(Remark)

The polymerization reaction in the Table 3-2 was performed such that the first to the third reactions were performed not consecutively, but on different days, and different raw materials were used for each of the monomer lots. Furthermore, the term "initiator solution added dropwise" in the polymerization method in the Table 3-2 means that the initiation of the reaction was carried out by dropwise addition of an aqueous solution of a polymerization initiator, while the term "mixed solution added dropwise" means that the initiation of the reaction was carried out by dropwise addition of a mixed solution.

The "uniform, transparent" of the external appearance means that the system is below the cloud point prior to the initiation of the reaction.

Test Example

Using the phosphoric acid ester-based polymer obtained in Examples 3-1 to 3-6 and Comparative Examples 3-1 to 3-3, the mortars blended as described in Table 3-3 were subjected to a test. The results are presented in Table 3-4. For the evaluation, the dispersibility and viscosity were measured by the following methods.

(1) Mortar Blend

TABLE 3-3

| W/C | Unit amount(g/batch) | | |
|---|---|---|---|
| (%) | W | C | S |
| 40 | 160 | 400 | 700 |

The materials used in the Table 3-3 are the same as those given in Table 1-2.

(2) Preparation of mortar, (3) evaluation, (3-1) fluidity, and (3-2) viscosity were measured as described in the above.

TABLE 3-4

| | Number of polymerization performed | Mw | Amount of addition (%) | Mortar viscosity (mPa·s) |
|---|---|---|---|---|
| Comparative example 3-1 | first second third | 58,000 52,000 49,000 | 0.248 0.218 0.205 | 3478 3255 3210 |
| Comparative example 3-2 | first second third | 30,000 27,000 25,000 | 0.148 0.155 0.172 | 3110 3052 3024 |
| Comparative example 3-3 | first second third | 34,000 31,000 30,000 | 0.126 0.130 0.133 | 3085 2958 2912 |
| Example 3-1 | first second third | 37,000 36,000 36,000 | 0.104 0.105 0.107 | 2774 2774 2750 |
| Example 3-2 | first second third | 36,000 36,000 35,000 | 0.108 0.105 0.106 | 2780 2774 2750 |

In Examples 3-1 to 3-2, the fluctuation in the molecular weight was small, and consequently, as for the resulting dispersing effect (necessary amount of addition) and viscosity reducing effect (mortar viscosity), the same performance was obtained with good reproducibility.

Preparation Example 4-A-1

366 g of water was introduced into a glass reaction vessel (four-necked flask) equipped with a stirrer, nitrogen purging was performed while stirring, and the temperature was elevated to 80° C. in a nitrogen atmosphere. A mixture of 450 g of ω-methoxypolyethylene glycol monomethacrylate (average number of added moles of ethylene oxide: 23) (effective fraction 60.8%, water fraction 35%), 71.6 g of a phosphoric acid esterification product (A), which was a mixture of a phosphoric acid mono(2-hydroxyethyl)methacrylic acid ester and phosphoric acid di[(2-hydroxyethyl)methacrylic acid]ester, and 4.5 g of 3-mercaptopropionic acid, and a solution prepared by dissolving 8.4 g of ammonium persulfate in 48 g of water, were both added dropwise, each over 1.5 hours. After aging for 1 hour, a solution prepared by dissolving 1.8 g of ammonium persulfate in 10 g of water was added dropwise over 30 minutes, and then aged at the same temperature (80° C.) for 1.5 hours. After completion of the aging, the system was cooled to 65° C. or below, and was neutralized with 44.4 g of a 32% aqueous solution of sodium hydroxide, to obtain a reaction liquid containing a copolymer having a weight average molecular weight of 35,000 (pH for monomer polymerization: 1.0, reaction rate: 100%). In addition, the phosphoric acid esterification product used herein was a product obtained by the following Preparation Examples 4 to 6.

Preparation Example 4-A-2

371 g of water was introduced into a glass reaction vessel (four-necked flask) equipped with a stirrer, nitrogen purging was performed while stirring, and the temperature was elevated to 80° C. in a nitrogen atmosphere. A mixture of 500 g of ω-methoxypolyethylene glycol monomethacrylate (average number of added moles of ethylene oxide: 23) (effective fraction 60.8%, water fraction 35%), 34.1 g of a phosphoric acid esterification product (A), which was a mixture of a phosphoric acid mono(2-hydroxyethyl)methacrylic acid ester and phosphoric acid di[(2-hydroxyethyl)methacrylic acid]ester, and 2.8 g of 3-mercaptopropionic acid, and a solution prepared by dissolving 7.2 g of ammonium persulfate in 41 g of water, were both added dropwise, each over 1.5 hours. After aging for 1 hour, a solution prepared by dissolving 1.6 g of ammonium persulfate in 9 g of water was added dropwise over 30 minutes, and then aged at the same temperature (80° C.) for 1.5 hours. After completion of the aging, the system was cooled to 65° C. or below, and was neutralized with 21.2 g of a 32% aqueous solution of sodium hydroxide, to obtain a reaction liquid containing a copolymer having a weight average molecular weight of 34,000 (pH for monomer polymerization: 1.1, reaction rate: 100%).

Preparation Example 4-A-3

381 g of water was introduced into a glass reaction vessel (four-necked flask) equipped with a stirrer, nitrogen purging was performed while stirring, and the temperature was elevated to 80° C. in a nitrogen atmosphere. A mixture of 520 g of ω-methoxypolyethylene glycol monomethacrylate (average number of added moles of ethylene oxide: 23) (effective fraction 60.8%, water fraction 35%), 28.6 g of a phosphoric acid esterification product (A), which was a mixture of a phosphoric acid mono(2-hydroxyethyl)methacrylic acid ester and phosphoric acid di[(2-hydroxyethyl)methacrylic acid]ester, and 2.8 g of 3-mercaptopropionic acid, and a solution prepared by dissolving 7.2 g of ammonium persulfate in 41 g of water, were both added dropwise, each over 1.5 hours. After aging for 1 hour, a solution prepared by dissolving 1.6 g of ammonium persulfate in 9 g of water was added dropwise over 30 minutes, and then aged at the same temperature (80° C.) for 1.5 hours. After completion of the aging, the system was cooled to 65° C. or below, and was neutralized with 17.7 g of a 32% aqueous solution of sodium hydroxide, to obtain a reaction liquid containing a copolymer having a weight average molecular weight of 36,000 (pH for monomer polymerization: 1.1, reaction rate: 100%).

Preparation Example 4-A-4

471 g of water was introduced into a glass reaction vessel (four-necked flask) equipped with a stirrer, nitrogen purging was performed while stirring, and the temperature was elevated to 80° C. in a nitrogen atmosphere. A mixture of 290 g of ω-methoxypolyethylene glycol monomethacrylate (average number of added moles of ethylene oxide: 9) (effective fraction 84.4%, water fraction 10%), 93.8 g of a phosphoric acid esterification product (A), which was a mixture of a phosphoric acid mono(2-hydroxyethyl)methacrylic acid ester and phosphoric acid di[(2-hydroxyethyl)methacrylic acid]ester, and 11.3 g of 3-mercaptopropionic acid, and a solution prepared by dissolving 8.2 g of ammonium persulfate in 46 g of water, were both added dropwise, each over 1.5 hours. After aging for 1 hour, a solution prepared by dissolving 3.3 g of ammonium persulfate in 19 g of water was added dropwise over 30 minutes, and then aged at the same temperature (80° C.) for 1.5 hours. After completion of the aging, the system was cooled to 65° C. or below, and was neutralized with 58.2 g of a 32% aqueous solution of sodium hydroxide, to obtain a reaction liquid containing a copolymer having a weight average molecular weight of 25,000 (pH for monomer polymerization: 1.0, reaction rate: 99%).

Preparation Example 4-A-5

489 g of water was introduced into a glass reaction vessel (four-necked flask) equipped with a stirrer, nitrogen purging was performed while stirring, and the temperature was elevated to 80° C. in a nitrogen atmosphere. A mixture of 290 g of ω-methoxypolyethylene glycol monomethacrylate (average number of added moles of ethylene oxide: 9) (effective fraction 84.4%, water fraction 10%), 53.2 g of a phosphoric acid esterification product (A), which was a mixture of a phosphoric acid mono(2-hydroxyethyl)methacrylic acid ester and phosphoric acid di[(2-hydroxyethyl)methacrylic acid]ester, and 9.1 g of 3-mercaptopropionic acid, and a solution prepared by dissolving 7.8 g of ammonium persulfate in 44 g of water, were both added dropwise, each over 1.5 hours. After aging for 1 hour, a solution prepared by dissolving 3.1 g of ammonium persulfate in 18 g of water was added dropwise over 30 minutes, and then aged at the same temperature (80° C.) for 1.5 hours. After completion of the aging, the system was cooled to 65° C. or below, and was neutralized with 33.0 g of a 32% aqueous solution of sodium hydroxide, to obtain a reaction liquid containing a copolymer having a weight average molecular weight of 21,000 (pH for monomer polymerization: 1.1, reaction rate: 98%).

The phosphoric acid esterification product (A) was a product obtained in Preparation Example 1-1.

Table 4-1 shows the feed molar ratio and the like of the Preparation Examples 4-A-1 to 4-A-5.

TABLE 4-1

| Preparation example | Feed raw materials | | | | Feed ratio (% by mole) | | |
|---|---|---|---|---|---|---|---|
| | Monomer 1 | | Monomer 2 | Monomer 3 | Monomer 1 | Monomer 2 | Monomer 3 |
| | Structure | n in Formula (1) | | | | | |
| 4-A-1 | MEPEG-E | 23 | HEMA-MPE | HEMA-DPE | 50 | 35 | 15 |
| 4-A-2 | MEPEG-E | 23 | HEMA-MPE | HEMA-DPE | 70 | 21 | 9 |
| 4-A-3 | MEPEG-E | 23 | HEMA-MPE | HEMA-DPE | 75 | 18 | 7 |
| 4-A-4 | MEPEG-E | 9 | HEMA-MPE | HEMA-DPE | 60 | 28 | 12 |
| 4-A-5 | MEPEG-E | 9 | HEMA-MPE | HEMA-DPE | 75 | 18 | 7 |

| Preparation example | Feed raw materials | | | | | |
|---|---|---|---|---|---|---|
| | Chain transfer agent | | Polymerization initiator | | Polymer Mw |
| | Kind | % by mole | Kind | % by mole | |
| 4-A-1 | 3-Mercaptopropionic acid | 10.5 | Ammonium persulfate | 11 | 35,000 |
| 4-A-2 | 3-Mercaptopropionic acid | 7.5 | Ammonium persulfate | 11 | 34,000 |
| 4-A-3 | 3-Mercaptopropionic acid | 7.5 | Ammonium persulfate | 11 | 36,000 |
| 4-A-4 | 3-Mercaptopropionic acid | 15.0 | Ammonium persulfate | 7 | 25,000 |
| 4-A-5 | 3-Mercaptopropionic acid | 12.5 | Ammonium persulfate | 7 | 21,000 |

The abbreviations MEPEG-E, HEMA-MPE, HEMA-DPE and Mw in the table are the same as those given in Table 1-1.

Examples 4-1 to 4-6 and Comparative Example 4-1 to 4-8

(1) Preparation of Copolymer Mixture

In Preparation Examples 4-A-1 to 4-A-5, each reaction liquid was obtained, and then the reaction liquid was cooled to 60° C. while stirring. 35% hydrogen peroxide was added in the predetermined amount indicated in Table 4-3, and then the resultant was subjected to mixing for 30 minutes at 60° C. Furthermore, the mixture was cooled to 40° C. or below, it was confirmed that the temperature was 40° C. or below, and then Topside 240 (manufactured by Permachem Asia, Ltd.) was added as a preservative in the predetermined amount indicated in Table 4-3, with mixing for 15 minutes, to thus obtain a mixture containing a copolymer (copolymer mixture).

As an example, in Example 4-1, a reaction liquid was obtained, and then the reaction liquid was cooled to 60° C. while stirring. 0.57 g of 35% hydrogen peroxide was added, and then the resultant was subjected to mixing for 30 minutes at 60° C. Furthermore, the mixture was cooled to 40° C. or below, it was confirmed that the temperature was 40° C. or below, and then 1.0 g of Topside 240 (manufactured by Permachem Asia, Ltd.) was added, with mixing for 15 minutes, to thus obtain a copolymer mixture.

(2) Amount of Residual Hydrogen Peroxide in Copolymer Mixture

The amount of residual hydrogen peroxide in the copolymer mixture was measured by the following method. Specifically, the amount of residual hydrogen peroxide was determined from the hydrogen peroxide concentration measured by a potassium iodide method (a method of reducing a sample with potassium iodide, titrating the leaving iodide with a sodium thiosulfate solution, and determining the amount by converting the amount to the amount of hydrogen peroxide). Details of the analytic method are as follows.

(2-1) About 5 g of a sample (copolymer mixture) was precisely weighed in a 200-ml conical flask with a stopper.

(2-2) About 100 ml of ion-exchanged water is added to dissolve the sample.

(2-3) 10 ml of a sulfuric acid solution (20 ml of sulfuric acid is slowly added to 100 ml of water to dilute the solution), and 10 ml of a 10% solution of potassium iodide (10 g of potassium iodide +90 ml of water) were added, and the flask is stoppered and placed in a dark place for about 30 minutes.

(2-4) The sample is titrated with a 0.1 mol/l standard sodium thiosulfate solution, 1 ml of a starch indicator solution is added before the end-point, and the point at which blue color is lost is taken as the end-point. At this time, if the titration solution foams up, about 10 ml of chloroform is added.

(2-5) A blank test is performed in parallel at the same time.

(2-6) From the following calculating equation, hydrogen peroxide (%) is determined, the value is converted to the amount of hydrogen peroxide in mg per 1 kg of the copolymer mixture, and the value is presented in Table 3.

Hydrogen peroxide (%)=$[(A-B) \times f \times 0.17]$/Amount of collected sample (g)

A: Amount of use (ml) of a 0.1 mol/l standard sodium thiosulfate solution required in the titration of sample B: Amount of use (ml) of a 0.1 mol/l standard sodium thiosulfate solution required in the titration of the blank test f: Factor of the 0.1 mol/l standard sodium thiosulfate solution (3) Presence or Absence of Putrefying Odor As for the putrefying odor, the presence or absence of an irritating odor was evaluated by a sensory test.

(4) Performance Evaluation

Using the phosphoric acid ester-based polymer obtained by the above-described production method, a test for the mortar of the blend indicated in Table 4-2 was performed. The results are presented in Table 4-3. The evaluation of the dispersibility and viscosity was performed by the following method.

(4-1) The mortar blending was performed in the same manner as in the case of Table 1-2, as shown in Table 4-2.

TABLE 4-2

| W/C | Unit amount(g/batch) | | |
|---|---|---|---|
| (%) | W | C | S |
| 40 | 160 | 400 | 700 |

(4-2) Preparation of mortar, (4-3) evaluation, (4-3-1) dispersibility and (4-3-2) viscosity were performed as described above. However, among the viscosity evaluation items, the torque of mortar immediately after kneading was measured.

Examples 4-7 and 4-8, where the Preparation Example was of identical combination, equivalent fluidity was respectively obtained in the same amounts of addition.

Preparation Example 5-1

A reaction tank equipped with a stirrer was purged with nitrogen (pressure was reduced to 13.0 kPa, and the pressure was returned to ambient pressure of 101.3 kPa with nitrogen). Under a nitrogen gas stream (3.0 $Nm^3$/h gas phase), 10731 kg of hot water at 70° C. was fed while mixing with nitrogen in a static mixer (manufactured by Tokyo Nisshin Jabara Co., Ltd.), to adjust the dissolved oxygen concentration in water at 25° C. to 0.1 mg/kg (value measured after cooling the water to 25° C. in a nitrogen atmosphere). Then, the water was heated to 78° C.

<Mixing Step>

Meanwhile, 10975 kg (effective fraction: 60.8%, water fraction: 35%) of ω-methoxypolyethylene glycol monomethacrylate (average number of added moles of ethylene oxide: 23) and 1744 kg of a phosphoric acid esterification product (A) [produced by the same method as in the Synthesis Example 1-B1], which is a mixture of a phosphoric acid mono (2-hydroxyethyl)methacrylic acid ester and phosphoric acid di(2-hydroxyethyl)methacrylic acid ester, were mixed in a mixed solution tank. The resulting mixture was further mixed with 9 kg of Dequest 2066 (phosphonic acid chelating agent, manufactured by Solutia, Inc., effective fraction: 25%), to condition the mixed solution. The temperature of each of the components at the time of mixing was all 30° C.

<Copolymerization Step>

The mixed solution which was prepared in the mixed solution tank and then maintained at 30° C. for 2 hours, an aqueous solution prepared by dissolving 205 kg of ammonium

TABLE 4-3

| | Preparation example | Amount of addition of hydrogen peroxide (mg/kg) | Amount of addition of preservative (mg/kg) | Amount of residual hydrogen peroxide (mg/kg) | Presence or absence of putrefying odor | Amount of addition (%) | Mortor viscosity (mPa·s) |
|---|---|---|---|---|---|---|---|
| Example4-1 | 4-A-1 | 200 | 1000 | Less than 100 | Absent | 0.110 | 2774 |
| Comparative example4-1 | | 200 | 0 | Less than 100 | Present | 0.110 | 2774 |
| Comparative example4-2 | | 0 | 1000 | — | Present | 0.111 | 2785 |
| Example4-2 | 4-A-2 | 200 | 1000 | Less than 100 | Absent | — | — |
| Example4-3 | 4-A-3 | 200 | 1000 | Less than 100 | Absent | — | — |
| Example4-4 | 4-A-4 | 1600 | 1000 | Less than 100 | Absent | 0.156 | 2914 |
| Example4-5 | | 1600 | 500 | Less than 100 | Absent | 0.155 | 2914 |
| Comparative example4-3 | | 1600 | 50 | Less than 100 | Present | 0.155 | 2922 |
| Comparative example4-4 | | 1600 | 0 | Less than 100 | Present | 0.155 | 2914 |
| Comparative example4-5 | | 0 | 1000 | — | Present | 0.156 | 2922 |
| Comparative example4-6 | | 3500 | 1000 | 1500 | Absent | 0.156 | 2914 |
| Example 4-6 | 4-A-5 | 400 | 1000 | Less than 100 | Absent | 0.215 | 2955 |
| Comparative example 4-7 | | 400 | 0 | Less than 100 | Present | 0.215 | 2955 |
| Comparative example 4-8 | | 0 | 1000 | — | Present | 0.214 | 2955 |

In the Table 4-3, the amounts of hydrogen peroxide and preservative are all in mg per 1 kg of reaction liquid.

In addition, in Example 4-1 with Comparative Examples 4-1 and 4-2, Examples 4-4 and 4-5 with Comparative Examples 4-3 to 4-6, and Example 4-6 with Comparative peroxide in 821 kg of water, and 111 kg of 3-mercaptopropionic acid were all added dropwise to a reaction tank maintained at 78° C., each over 1.5 hours. At that time, the mixed solution was maintained at a temperature of 30° C. until the solution was introduced to the reaction system. After completion of the dropwise addition, 700 kg of water was fed to the mixed solution tank, and the water was rapidly introduced to the reaction tank. Thereafter, to the reaction tank maintained at 78° C., an aqueous solution prepared by dissolving 45 kg of ammonium peroxide in 180 kg of water was added dropwise over 30 minutes, and after completion of the dropwise addition, the mixture was aged for 1 hour at 80° C. After the completion of aging, the system was neutralized with 1542 kg of a 30% sodium hydroxide solution, while cooling, and 30% sodium hydroxide was introduced, while checking the pH, to thus obtain an aqueous solution of a phosphoric acid ester-based polymer at pH 5.8. The content of unreacted monomer 2 and monomer 3 in the reaction product was 0.5% by mole based on the total of the feed amount of the monomer 2 and monomer 3.

<Post-Treatment Step>

An aqueous solution of the resulting phosphoric acid ester-based polymer was cooled to 70° C., 11 kg of 35% hydrogen peroxide (400 mg based on 1 kg of reaction liquid) was added, and then the mixture was mixed with stirring for 60 minutes at 70° C. The amount of residual hydrogen peroxide after the mixing and stirring was less than 100 mg/kg. Moreover, the reaction liquid was cooled to reach 60° C. or below, it was confirmed that the temperature was 60° C. or below, and then 27 kg of Topside 240 (preservative, manufactured by Permachem Asia, Ltd.) (1000 mg based on 1 kg of reaction liquid) was added, with mixing for 10 minutes, to thus obtain a mixture containing a copolymer (copolymer mixture).

Preparation Example 5-2

A copolymer mixture was obtained in the same manner as in Preparation Example 1, except that the post-treatment step was not carried out.

Preparation Example 5-3

A copolymer mixture was obtained in the same manner as in Preparation Example 1, except that a mixed solution maintained at 30° C. for 11.5 hours was used instead of the mixed solution maintained at 30° C. for 2 hours after the preparation in the mixed solution by the copolymerization step.

The Mw and converted viscosity of the polymers obtained in Preparation Examples 5-1 to 5-3 are presented in Table 5-1 as Examples, together with the reaction conditions in the

TABLE 5-1

| Example | PAD No. | Composition No. | Dissolved oxygen concentration mg/kg | Iron ion concentration mg/kg | Chelating agent Kind | Amount of addition mg/kg | Monomer mixed solution Polymerization method | Preparation temperature (° C.) | Time (hour) | Maintenance temperature ° C. |
|---|---|---|---|---|---|---|---|---|---|---|
| Example 5-1 | 5023 | Preparation example 5-1 | 0.1 | 0 | Dequest 2066 | 180 | Mixed solution added dropwise | 30 | 2 | 30 |
| Example 5-2 | 5023 | Preparation example 5-2 | 0.1 | 0 | Dequest 2066 | 180 | Mixed solution added dropwise | 30 | 2 | 30 |
| Example 5-3 | 5023 | Preparation example5-3 | 0.1 | 0 | Dequest 2066 | 180 | Mixed solution added dropwise | 30 | 11.5 | 30 |

| Example | Number of polymerization performed | $M_W$ | Hydrogen peroxide Amount of addition mg/kg | Residual amount mg/kg | Preservative Kind | Amount of addition | Amount of addition | Converted viscosity |
|---|---|---|---|---|---|---|---|---|
| Example 5-1 | First | 34,000 | 400 | 100> | Topside 240 | 1000 | 0.106 | 2857 |
|  | Second | 33,000 |  |  |  |  | 0.109 | 2828 |
|  | Third | 32,000 |  |  |  |  | 0.106 | 2857 |
| Example 5-2 | First | 34,000 | — | — | — | — | 0.106 | 2857 |
|  | Second | 33,000 |  |  |  |  | 0.108 | 2828 |
|  | Third | 32,000 |  |  |  |  | 0.106 | 2857 |
| Example 5-3 | First | 35,000 | 400 | 100> | Topside 240 | 1000 | 0.106 | 2828 |

In Examples 5-1 and 5-2, fluctuation in the molecular weight was small, and consequently, as for the obtained performance (necessary amount of addition, mortar viscosity), the same performance was obtained with good reproducibility. From Example 4-6 and Comparative Example 4-7, it is suspected that Example 5-1 exhibits the performance of preservative.

After the preparation in the mixed solution tank, the molecular weight and performance (necessary amount of addition, mortar viscosity) of Example 5-3 maintained for 11.5 hours were almost equal to those of Example 5-1 maintained for 2 hours. From the results of Example 3-1, Example 3-2, Example 3-5, Example 3-6 and Comparative Example 3-3, it is suspected that polymers having equal performance can be obtained with good reproducibility, in about 72 hours, and at least in about 36 hours, after the preparation in the mixed solution tank.

The invention claimed is:

1. A method for producing a phosphoric acid ester-based polymer, comprising a mixing step of preparing a mixed solution comprising a monomer 1 represented by the following formula (1), a monomer 2 represented by the following formula (2), and a monomer 3 represented by the following formula (3) and a copolymerizing step of copolymerizing monomer 1, monomer 2 and monomer 3, wherein the mixing step is mixing the monomers 1, 2 and 3 at a temperature of 10 to 50° C., the copolymerizing step is copolymerizing the monomers at pH 7 or lower, in a polymerization solvent having a dissolved oxygen concentration at 25° C. of 0.01 to 4.0 mg/kg, in the presence of a phosphonic acid chelating agent, the copolymerizing step is initiated within 72 hours after the mixing step and the temperature of the mixed solution is maintained in the range of 10 to 50° C. until the copolymerizing step is initiated:

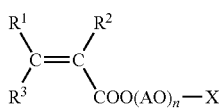
(1)

wherein $R^1$ and $R^2$ each represent a hydrogen atom or a methyl group; and $R^3$ represents a hydrogen atom or —COO(AO)$_n$X [wherein AO represents an oxyalkylene group or oxystyrene group having 2 to 4 carbon atoms; n represents an average number of added moles of AO, and is a number from 3 to 200; and X represents a hydrogen atom or an alkyl group having 1 to 18 carbon atoms],

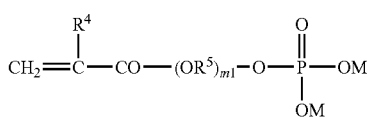
(2)

wherein $R^4$ represents a hydrogen atom or a methyl group; $R^5$ represents an alkylene group having 2 to 12 carbon atoms; m1 represents a number from 1 to 30; and M represents a hydrogen atom, an alkali metal or an alkaline earth metal, and

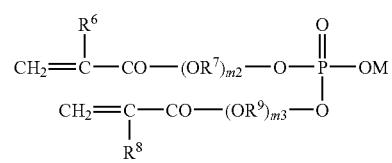
(3)

wherein $R^6$ and $R^8$ each represent a hydrogen atom or a methyl group; $R^7$ and $R^9$ each represent an alkylene group having 2 to 12 carbon atoms; m2 and m3 each represent a number from 1 to 30; and M represents a hydrogen atom, an alkali metal or an alkaline earth metal.

2. The method according to claim 1, wherein the monomers 2 and 3 are obtained by reacting an organic hydroxy compound represented by the following formula (4) with a phosphorylating agent:

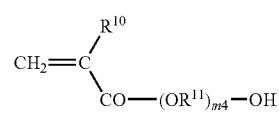
(4)

wherein $R^{10}$ represents a hydrogen atom or a methyl group; $R^{11}$ represents an alkylene group having 2 to 12 carbon atoms; and m4 represents a number from 1 to 30.

3. The method according to claim 1 or claim 2, wherein the monomers 1 to 3 are copolymerized in the presence of a chain transfer agent.

4. The method according to claim 3, wherein the chain transfer agent is used in an amount of 4% by mole or more based on the total number of moles of the monomers 1 to 3.

5. A method for producing a phosphoric acid ester-based polymer, comprising copolymerizing a monomer 1 represented by the following formula (1), a monomer 2 represented by the following formula (2), and a monomer 3 represented by the following formula (3) at pH 7 or lower, in the presence of a polymerization solvent having a dissolved oxygen concentration at 25° C. of 0.01 to 4.0 mg/kg:

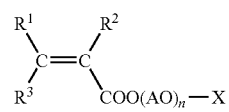
(1)

wherein $R^1$ and $R^2$ each represent a hydrogen atom or a methyl group; and $R^3$ represents a hydrogen atom or —COO(AO)$_n$X [wherein AO represents an oxyalkylene group or oxystyrene group having 2 to 4 carbon atoms; n represents an average number of added moles of AO, and is a number from 3 to 200; and X represents a hydrogen atom or an alkyl group having 1 to 18 carbon atoms],

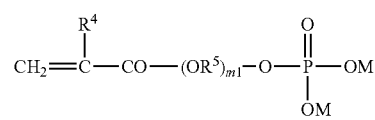
(2)

wherein $R^4$ represents a hydrogen atom or a methyl group; $R^5$ represents an alkylene group having 2 to 12 carbon atoms; m1 represents a number from 1 to 30; and M represents a hydrogen atom, an alkali metal or an alkaline earth metal, and

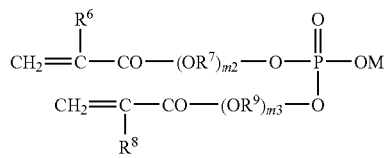
(3)

wherein $R^6$ and $R^8$ each represent a hydrogen atom or a methyl group; $R^7$ and $R^9$ each represent an alkylene group having 2 to 12 carbon atoms; m2 and m3 each represent a number from 1 to 30; and M represents a hydrogen atom, an alkali metal or an alkaline earth metal.

6. The method according to claim 5, wherein the polymerization solvent has been adjusted in the dissolved oxygen concentration by mixing the polymerization solvent and nitrogen gas by way of a static mixer.

7. The method according to claim 5 or claim 6, wherein the monomers 1 to 3 are copolymerized in the presence of a chain transfer agent.

8. A method for producing a phosphoric acid ester-based polymer, comprising copolymerizing a monomer 1 represented by the following formula (1), a monomer 2 represented by the following formula (2), and a monomer 3 represented by the following formula (3) at pH 7 or lower, in the presence of a phosphonic acid-based chelating agent:

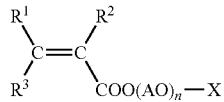
(1)

wherein $R^4$ and $R^2$ each represent a hydrogen atom or a methyl group; and $R^3$ represents a hydrogen atom or —COO(AO)$_n$X [wherein AO represents an oxyalkylene group or oxystyrene group having 2 to 4 carbon atoms; n represents an average number of added moles of AO, and is a number from 3 to 200; and X represents a hydrogen atom or an alkyl group having 1 to 18 carbon atoms],

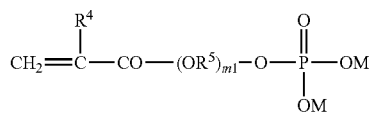
(2)

wherein $R^4$ represents a hydrogen atom or a methyl group; $R^5$ represents an alkylene group having 2 to 12 carbon atoms; m1 represents a number from 1 to 30; and M represents a hydrogen atom, an alkali metal or an alkaline earth metal, and

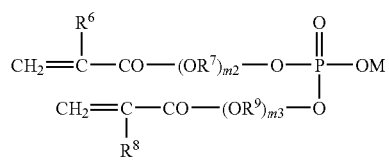
(3)

wherein $R^6$ and $R^8$ each represent a hydrogen atom or a methyl group; $R^7$ and $R^9$ each represent an alkylene group having 2 to 12 carbon atoms; m2 and m3 each represent a number from 1 to 30; and M represents a hydrogen atom, an alkali metal or an alkaline earth metal.

9. The method according to claim 8, wherein the monomers 1 to 3 are copolymerized in the presence of a chain transfer agent.

10. A method for producing a phosphoric acid ester-based polymer from a mixed solution containing a monomer 1 represented by the following formula (1), a monomer 2 represented by the following formula (2), and a monomer 3 represented by the following formula (3), comprising preparing the mixed solution by mixing the monomers 1 to 3 at a temperature of 10 to 50° C., initiating a polymerization within 72 hours after the mixing of the monomers 1 to 3, and maintaining the temperature of the mixed solution in the range of 10 to 50° C. until the time when the polymerization is initiated:

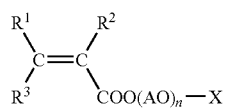
(1)

wherein $R^1$ and $R^2$ each represent a hydrogen atom or a methyl group; and $R^3$ represents a hydrogen atom or —COO(AO)$_n$X [wherein AO represents an oxyalkylene group or oxystyrene group having 2 to 4 carbon atoms; n represents an average number of added moles of AO, and is a number from 3 to 200; and X represents a hydrogen atom or an alkyl group having 1 to 18 carbon atoms],

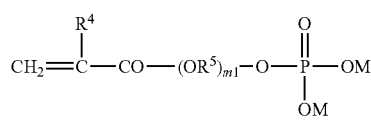
(2)

wherein $R^4$ represents a hydrogen atom or a methyl group; $R^5$ represents an alkylene group having 2 to 12 carbon atoms; m1 represents a number from 1 to 30; and M represents a hydrogen atom, an alkali metal or an alkaline earth metal, and

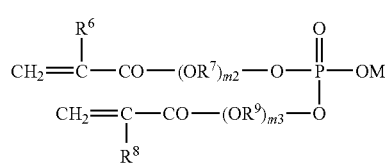
(3)

wherein $R^6$ and $R^8$ each represent a hydrogen atom or a methyl group; $R^7$ and $R^9$ each represent an alkylene group having 2 to 12 carbon atoms; m2 and m3 each represent a number from 1 to 30; and M represents a hydrogen atom, an alkali metal or an alkaline earth metal.

11. The method according to claim 10, wherein a solution comprising a chain transfer agent is further used at a solution temperature maintained in the range of 10 to 50° C. until polymerization is initiated.

12. The method according to claim 1, wherein 50 to 3000 mg of hydrogen peroxide is added based on 1 kg of the reaction liquid after the copolymerization reaction, and then 100 to 3000 mg of a preservative is further added based on 1 kg of the reaction liquid.

13. A dispersant for a hydraulic composition, which dispersant contains the phosphoric acid ester-based polymer obtained by the method according to claim 1.

14. A hydraulic composition comprising the phosphoric acid ester-based polymer obtained by the method according to claim 1, a hydraulic powder and water.

* * * * *